(12) United States Patent
Kamakura

(10) Patent No.: US 10,345,581 B2
(45) Date of Patent: Jul. 9, 2019

(54) DISPLAY DEVICE AND HEAD MOUNTED IMAGE DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/640,826

(22) Filed: Jul. 3, 2017

(65) Prior Publication Data
US 2018/0017786 A1    Jan. 18, 2018

(30) Foreign Application Priority Data
Jul. 14, 2016   (JP) .................................. 2016-139580

(51) Int. Cl.
*G02B 7/18* (2006.01)
*G02B 27/00* (2006.01)
*G02B 27/01* (2006.01)

(52) U.S. Cl.
CPC ..... *G02B 27/0006* (2013.01); *G02B 27/0172* (2013.01); *G02B 27/0176* (2013.01); *G02B 2027/0134* (2013.01)

(58) Field of Classification Search
CPC ............. G02B 27/006; G02B 27/0172; G02B 27/0176; G02B 7/021

USPC ........................................................ 359/513
See application file for complete search history.

(56) References Cited

U.S. PATENT DOCUMENTS

| 6,680,802 B1* | 1/2004 | Ichikawa ........... G02B 27/0172 359/630 |
| 9,167,065 B2 | 10/2015 | Mikami et al. |
| 2008/0191464 A1* | 8/2008 | Yankovitz ............... A01C 21/00 285/5 |
| 2009/0168131 A1 | 7/2009 | Yamaguchi et al. |
| 2010/0027135 A1* | 2/2010 | Sodeyama ............. G02B 7/021 359/740 |
| 2015/0177520 A1 | 6/2015 | Hiraide et al. |

FOREIGN PATENT DOCUMENTS

| JP | 2009-157290 A | 7/2009 |
| JP | 5218652 B2 | 6/2013 |
| JP | 5531547 B2 | 6/2014 |
| JP | 2015-005340 A | 1/2015 |
| JP | 2015-121740 A | 7/2015 |
| WO | 2010/131420 A1 | 11/2010 |

\* cited by examiner

*Primary Examiner* — Euncha P Cherry
(74) *Attorney, Agent, or Firm* — Oliff PLC

(57) ABSTRACT

A display device includes: an optical member that guides incident image light; a frame member that includes an opening in which a part of the optical member is inserted and holds the optical member; and a water repellent layer that is located between the optical member and an inner surface of the opening.

17 Claims, 15 Drawing Sheets

DISPLAY DEVICE AND HEAD MOUNTED IMAGE DISPLAY APPARATUS

BACKGROUND

1. Technical Field

The present invention relates to a display device and a head mounted image display apparatus.

2. Related Art

In the related art, there are known head mounted image display apparatuses mounted on the heads of users. A video display apparatus that has a waterproof structure is known as the head mounted image display apparatus (for example, see JP-A-2009-157290).

The video display apparatus disclosed in JP-A-2009-157290 includes a display element, a prism (light-guiding member), a casing that contains and holds the display element and the prism, and a packing. Of the elements, the packing is disposed to come into contact with the casing and a portion from which video light in the periphery of the prism is not reflected. Thus, the video display apparatus disclosed in JP-A-2009-157290 suppresses infiltration of a fluid such as water into the casing.

Incidentally, in the video display apparatus disclosed in JP-A-2009-157290, the light-guiding member guides image light to the eyes of a user. Therefore, it is necessary to dispose the light-guiding member within the casing (the video display apparatus) with high precision.

However, the configuration disclosed in JP-A-2009-157290 has a problem that the light-guiding member may not be disposed with high precision since a waterproof member is pressed when the waterproof member such as a packing is disposed between each surface of the light-guiding member and an external case forming the casing and is pressed, and thus the light-guiding member is moved from a position to which the image light can reliably be guided. Even when the position of an image projection unit is not changed with respect to the light-guiding member, an entire optical system is considered to be moved. In a binocular video display apparatus, a user can view an image. However, since right and left image display may be deviated, there is a problem that an image (in particular, a 3D image) may not be recognized accurately.

Since it is necessary for an external surface of the light-guiding member to guide image light to the eyes of the user while internally reflecting the image light, the waterproof member is not installed in a portion contributing to reflection of the light-guiding member. However, for example, in a case in which the waterproof member is not installed in the circumference of the light-guiding member, a fluid may be infiltrated into a frame member from a portion between the light-guiding member and the casing (external case).

However, even in a case in which the waterproof member is installed in a portion that does not contribute to reflection of the light-guiding member, there is a problem that a slight gap occurs between one surface of the light-guiding member and the external case due to tolerance and heat of a material of which the light-guiding member and the external case are formed, and thus a fluid such as water infiltrates into the casing via the gap due to capillarity.

SUMMARY

An advantage of some aspects of the invention is to provide a display device and a head mounted image display apparatus capable of improving a waterproof property.

A display device according to a first aspect of the invention includes: an optical member that guides incident image light; a frame member that includes an opening in which a part of the optical member is inserted and holds the optical member; and a water repellent layer that is located between the optical member and an inner surface of the opening.

As the optical member, a projection lens or the like that emits image light can be exemplified in addition to the light-guiding member that guides incident image light. When the frame member includes all the members holding the optical member, for example, a display unit is formed by the light-guiding member (optical member) and the members holding the light-guiding member. In a case in which the members are held by the frame, the members holding the light-guiding member in the display unit is equivalent to the frame member.

According to the first aspect, the water repellent layer is disposed between the optical member and the inner surface of the opening of the frame member. Therefore, even in a case in which a gap is formed between the optical member and the inner surface of the opening, the fluid infiltrating into the gap due to capillarity becomes a droplet due to the water repellent effect of the water repellent layer. For example, there is a high possibility of the droplet generated due to the water repellent effect having a greater diameter than the dimensions of the gap. Therefore, the droplet is suppressed from infiltrating into the gap by the water repellent layer. Accordingly, since the fluid such as water can be suppressed from infiltrating into the frame member holding the optical member by the water repellent layer, the water proof property of the display device can be improved.

Even when the gap is formed, the infiltration of the fluid into the frame member can be suppressed. Therefore, the optical member can be disposed so that the optical member does not come into contact with the inner surface of the opening. Thus, at the time of assembling the display device, stress can be suppressed from being applied to the optical member. Therefore, the deviation in the position of the optical member can be suppressed.

In the first aspect, it is preferable that the display device includes an image projection unit that projects the image light to the optical member, the optical member includes an incidence surface on which the image light projected by the image projection unit is incident, and the incidence surface and the image projection unit are located inside the frame member.

In such a configuration, since a fluid such as water can be suppressed from infiltrating into the frame member by the water repellent layer. Therefore, the fluid can be reliably suppressed from being attached to the image projection unit and the incidence surface of the optical member located inside the frame member. Thus, an image projected from the image projection unit can reliably be incident on the incidence surface of the optical member. Accordingly, it is possible to improve reliability of the display device that displays the image based on the image light.

In the first aspect, it is preferable that the display device further includes a waterproof member that is installed in at least apart of an incident unit located inside the frame member in the optical member, and the water repellent layer is located in at least one of the waterproof member and the frame member.

In such a configuration, the fluid can be suppressed from infiltrating into the frame by the waterproof member installed in the incidence portion located inside the frame member in the optical member. The water repellent layer is located on at least one of the waterproof member and the frame member. Therefore, in a case in which the gap is formed between the waterproof member and the frame member, the fluid can be suppressed from infiltrating from the gap. Accordingly, the fluid can be reliably suppressed from infiltrating into the frame member more than in a case in which the waterproof member is not installed.

In the first aspect, it is preferable that the waterproof member covers circumference of at least a part of the incident unit, and in the waterproof member, a part on a side of the incidence surface is thinner than other parts.

In such a configuration, since the waterproof member is installed in the circumference of at least a part of the incidence portion located inside the frame member of the optical member, the fluid can be suppressed from infiltrating into the frame member more than, for example, in a case in which a waterproof member is installed only in a part of the incidence portion.

For example, in a case in which the portion of the waterproof member on the incidence surface side is relatively thick, a deformation amount increases due to thermal expansion or the like of the portion on the incidence surface and there is a high possibility of the portion of the incidence surface side coming into contact with the frame member. Further, there is a possibility that the position of the light-guiding member in which the waterproof member is installed is deviated.

In such a configuration, however, the portion on the incidence surface side is thinner than another portion. Therefore, even in a case in which the portion is deformed, the deformation amount of this portion can be reduced, and thus this portion is suppressed from coming into contact with the frame member. Accordingly, it is possible to reduce the possibility of the position of the optical member being deviated. Further, the image light can reliably be incident from the incidence surface.

In the first aspect, it is preferable that the waterproof member is disposed on an opposite surface side to the incidence surface of the optical member and in a traveling direction of the image light guided by the optical member so that a gap is formed with the frame member, and the water repellent layer is located in at least one of a portion of the frame member in which the gap is formed and a portion of the waterproof member.

In such a configuration, since the water repellent layer is disposed between the waterproof member (the gap) and the inner surface on the opposite side to the incidence surface of the optical member with the optical member interposed therebtween, the fluid can be suppressed from infiltrating into the frame member from the gap.

Since the gap is present between the waterproof member and the frame member, the portion in the waterproof member does not come into the inner surface of the frame member. That is, since the surface opposite to the incidence surface from which the light incident from the incidence surface of the optical member is reflected does not come into contact with the inner surface, the image light can reliably be reflected from this surface. Accordingly, it is possible to further improve the reliability of the display device.

In the first aspect, it is preferable that, in the waterproof member, a different surface from a surface in which the gap is formed comes into contact with an inner surface of the frame member.

In such a configuration, since the different surface from the surface in which the gap is formed comes into contact with the inner surface of the frame member, the fluid can be suppressed from infiltrating into the frame member from the surface other than the surface in which the gap is formed.

Since at least one surface (the surface opposite to the incidence surface) of the optical member does not come into contact with the inner surface of the frame, movement of the waterproof member to the frame member can be suppressed due to any pressure or stress.

In the first aspect, it is preferable that the water repellent layer is located in a portion of an inner surface of the opening which faces the waterproof member.

In such a configuration, since the water repellent layer is located at a portion facing the waterproof member in the inner surface, the fluid can be reliably suppressed from infiltrating into the case member from the gap between the inner surface and the waterproof member. Since the water repellent layer is formed on the inner surface, the water repellent layer can be easily disposed (attached) more than, for example, in a case in which the water repellent layer is formed in the waterproof member.

In the first aspect, it is preferable that the waterproof member is formed of one of a silicon resin and an elastic material with a water repellent property.

In such a configuration, since the waterproof member is formed of a silicon resin, a fluid such as water can be suppressed from soaking in the waterproof member. Since a silicon resin has a water repellent property, the fluid can be reliably suppressed from infiltrating into the case member due to the water repellent property of the water repellent layer and the waterproof member.

Further, for example, the waterproof member is formed of a silicon resin, heat resistance is high. Therefore, the waterproof member can be suppressed from deteriorating. For example, in a case in which the waterproof member is formed of an elastic member (for example, a rubber not subject to sulfur vulcanization), the fluid can be suppressed from infiltrating into the case member from a portion in which the inner surface of the case member comes into contact with the waterproof member.

In the first aspect, it is preferable that the water repellent layer is formed in the optical member.

In such a configuration, the water repellent layer is formed on the optical member. Therefore, for example, even in a case in which the waterproof member is not included, the fluid can be suppressed from infiltrating into the frame member. In a case in which the waterproof member is not installed, the optical member is held by the frame member. Therefore, the position of the optical member can be reliably suppressed from being deviated when the waterproof member is pressed by the frame member.

In the first aspect, it is preferable that the water repellent layer is formed of a coating agent with a water repellent property.

In such a configuration, the water repellent layer is formed of the coating agent with the water repellent property. Therefore, by merely coating a position at which the water repellent layer is formed with the coating agent, it is possible to easily forming the water repellent layer at each of the positions. Accordingly, since the water repellent layer can be easily configured, an assembly process for the display devices can be simplified.

In the first aspect, it is preferable that the coating agent contains a fluoropolymer.

In such a configuration, when the fluid comes into contact with the water repellent layer formed of the coating agent, the fluid becomes a droplet and the droplet can remain on the water repellent layer. Accordingly, it is possible to further improve the water proof property of the display device.

In the first aspect, it is preferable that the water repellent layer is formed of a sealing material.

In such a configuration, by merely attaching the sealing material to the position at which the water repellent layer is formed, the water repellent layer can be formed inside the case member. Accordingly, since the water repellent layer can be easily configured, assembly process for the display device can be simplified.

A head mounted image display apparatus according to a second aspect of the invention includes: the display device described above; and a mounting member that mounts the display device on a head of an observer.

According to the second aspect, it is possible to obtain the same advantages as those of the display device according to the first aspect. In the configuration of the display device, the fluid such as water can be suppressed from infiltrating into the display device. Therefore, the head mounted image display device can be appropriately used even in an environment in which rainwater or the like falls.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described with reference to the drawings.

Figure 1:
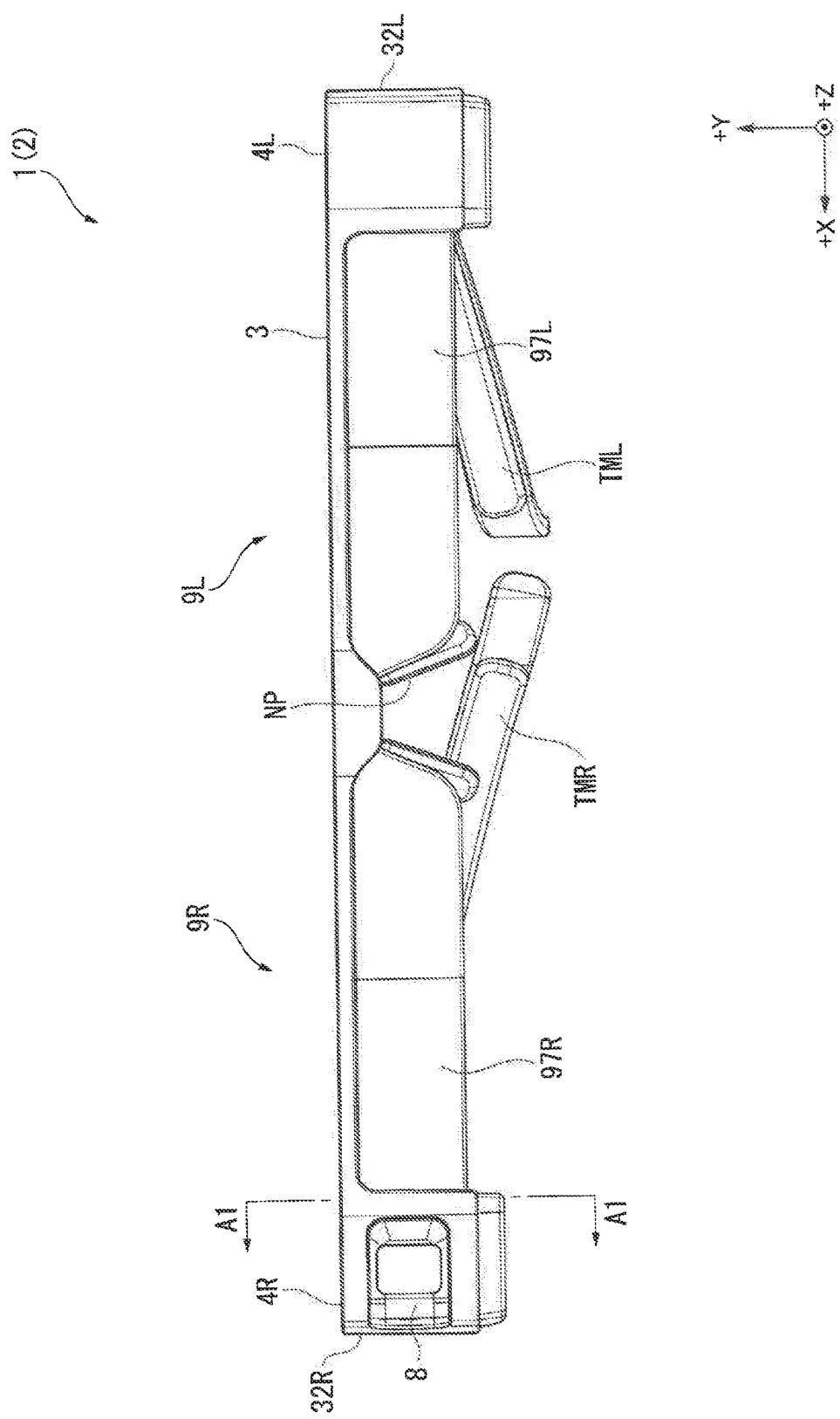
FIG. 1 is a plan view illustrating an HMD according to an embodiment of the invention.
Figure 2:
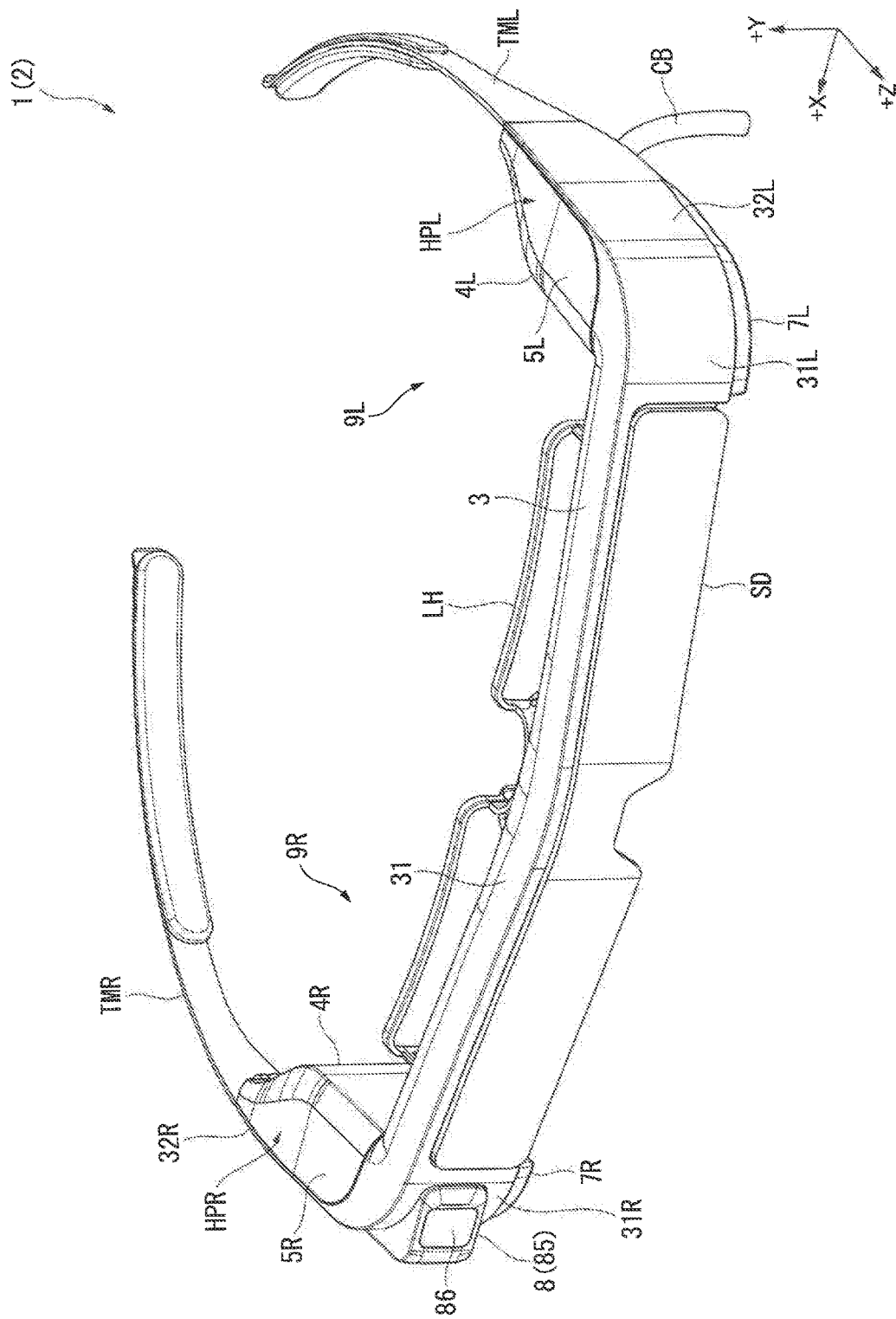
FIG. 2 is a perspective view illustrating the HMD on which a lens holder and a light-shielding member are mounted according to the embodiment.
Figure 3:
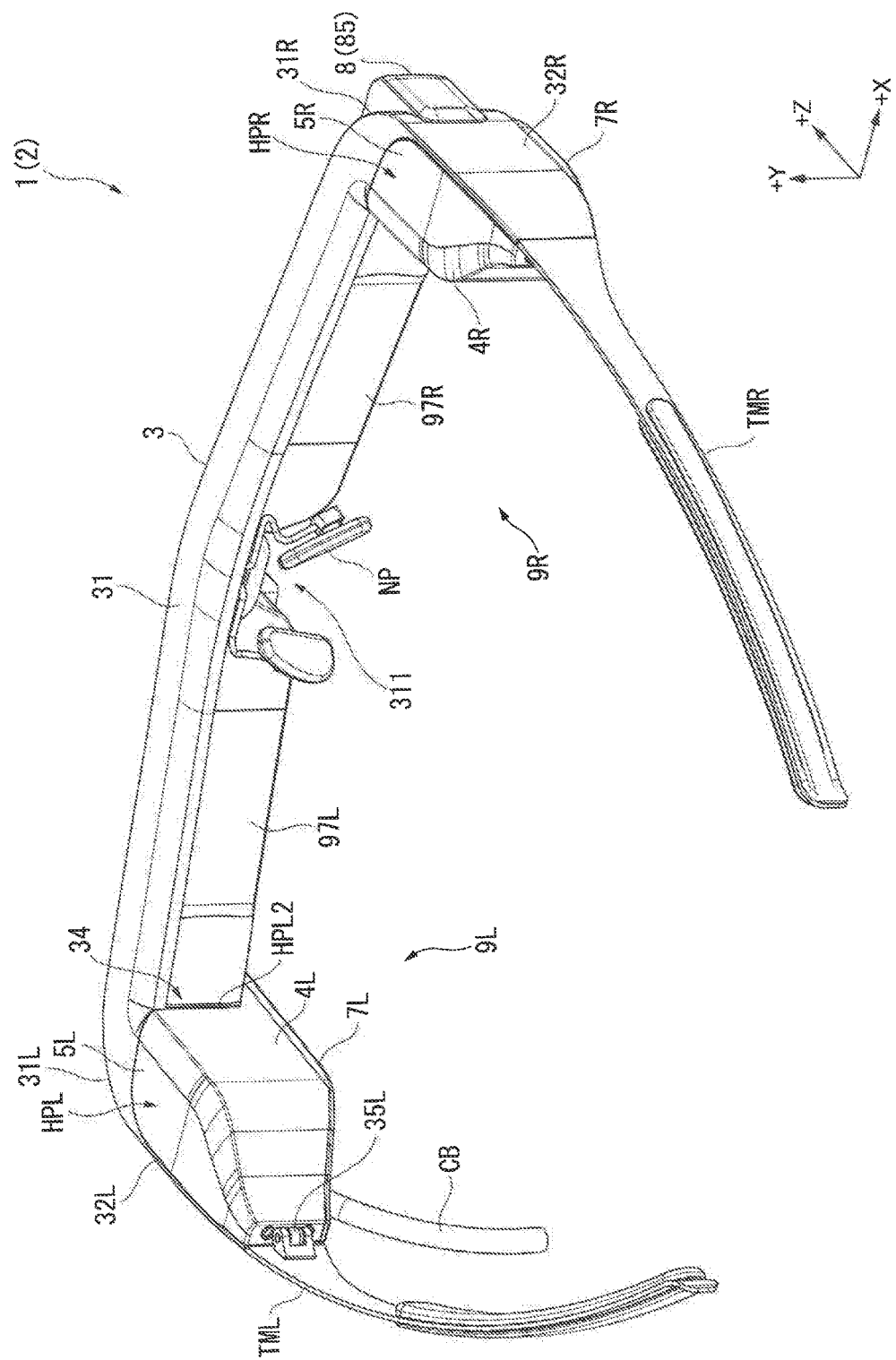
FIG. 3 is a perspective view illustrating the HMD on which a nose pad and the light-shielding member according to the embodiment are mounted.

FIGS. 1 to 3 are diagrams illustrating the exterior of an HMD 1 according to the embodiment. More specifically, FIG. 1 is a front view illustrating the HMD 1 and FIG. 2 is a perspective view illustrating the HMD 1 when viewed from the upper side on the front surface side. FIG. 3 is a perspective view illustrating the HMD 1 when viewed from the upper side on the rear surface side. FIG. 2 illustrates the HMD 1 on which a lens holder LH and a light-shielding member SD are mounted. FIG. 3 illustrates the HMD on which nose pads NP and the light-shielding member SD are mounted.

The head mounted display (HMD) 1 according to the embodiment is mounted on the head of a user to be used and is a see-through head mounted image display apparatus that displays an image so that the user can view the image and enables outside light to transmit so that the user to observe the external world. As illustrated in FIGS. 1 to 3, the HMD 1 includes a frame 2, and an imaging device 8 (see FIG. 1) and two optical devices 9R and 9L held by the frame 2. In addition, the HMD 1 is configured such that the nose pads NP (see FIG. 3), the lens holder LH (see FIG. 2), and the light-shielding member SD (see FIG. 2) can be detachably mounted on the frame 2.

As will be described below, the HMD 1 according to the embodiment is characterized in that a waterproof property of image projection units 91 and control units 96 disposed inside accommodation units HPR and HPL is achieved.

In the following description, in a case of a front view of the user on which the HMD 1 is mounted, a side on which the HMD 1 is observed is referred to as a front surface side (or front side) and its opposite side is referred to as a rear surface side (or the rear side). The upper side and the lower side of the HMD 1 correspond to the upper side and the lower side of the user. The right side and the left side of the HMD 1 correspond to the right side and the left side of the user on which the HMD 1 is mounted.

In the following drawings and description, of +X, +Y, and +Z directions perpendicular to each other, the +Z direction is referred to as a direction oriented from the rear surface side to the front surface side, the +Y direction is referred to as a direction oriented from the lower side to the upper side, and the +X direction is referred to as a direction oriented from the left side to the right side. Further, to facilitate the description, an opposite direction to the +Z direction is referred to as a −Z direction. The same applies to −Y and −X directions.

Configuration of Nose Pad

As illustrated in FIG. 3, the nose pads NP are installed to be insertable from the rear surface side into a mounting unit 311 located between light-guiding members 97R and 97L to be described in a frame body 3. The nose pads NP pinch the nose of the user (portions corresponding to the wings of the nose) between the right and left at the time of mounting the HMD 1, and thus the HMD 1 is suppressed from being misaligned rightward or leftward and misaligned downward.

Configuration of Lens Holder

The lens holder LH has a glasses-like configuration with no temple, as illustrated in FIG. 2. The lens holder LH holds right and left lenses (not illustrated) for correcting eyesight and is installed in the mounting unit 311 to be insertable from the rear surface side.

Configuration of Light-Shielding Member

As illustrated in FIG. 2, the light-shielding member SD is mounted to be detachably mounted on the mounting unit 311 so that the light-guiding members 97R and 97L are covered on the front surface side which is the opposite side to the nose pads NP and the lens holder LH between the light-guiding members 97R and 97L. The light-shielding member SD shields at least a part of outside light incident on the light-guiding members 97R and 97L so that it is difficult to see the external world, thereby improving visibility of an image to be displayed.

Schematic Configuration of Frame

As illustrated in FIGS. 1 to 3, the frame 2 has a configuration similar to the frame of glasses and holds not only the imaging device 8 and the optical devices 9R and 9L but also the nose pads NP, the lens holder LH, and the light-shielding member SD. The frame 2 includes a frame body 3 that has a substantial U shape when viewed from the upper side, case members 4R and 4L mounted on the frame body 3, and temples TMR and TML installed in the frame body 3.

Of these elements, the right temple TMR and the left temple TML are elements that are suspended on the ears of the user and hold the HMD 1. The temples TMR and TML are connected to holding units 35R and 35L installed in the frame body 3 to be bendable toward the user. By extending the temples TMR and TML to corresponding side surface units 32R and 32L substantially in parallel, the temples TMR and TML can be suspended on the right and left ears of the user so that the HMD 1 is mounted on the head. On the other hand, in a case in which the HMD 1 is not mounted on the user, the temples TMR and TML can be folded up by bending the temples TMR and TML inward.

The temples TMR and TML are configured with plates in which elastic members such as rubber with H-shaped cross-sectional surfaces exposed to the surface on the user side and the opposite side to the user side are fitted. The plates can be formed of metal such as synthetic resin or titanium. The temples TMR and TML are equivalent to a mounting member of the invention.

The elastic member is not limited to such a configuration. The elastic member may be attached or fitted in a surface of the plate on the user side and an opposite surface of the plate to the user side or may be installed on only one of the surfaces.

The frame body 3 includes a front unit 31 formed along the forehead of the user and the side surface units 32R and 32L extending from both the right and left ends of the front unit 31 to the rear surface side (the back side of the user) intersecting the front unit 31 and formed along the right and left temples of the user. The frame body 3 is an integrally molded body which is made of metal and which the front unit 31 and the side surface units 32R and 32L are integrally formed.

The front unit 31 is a portion formed along the horizontal direction of the frame body 3. The front unit 31 holds the light-guiding members 97R and 97L serving as display units disposed in front of the right and left eyes of the user and also holds the nose pads NP, the lens holder LH, and the light-shielding member SD in the mounting unit 311 located between the held light-guiding members 97R and 97L. A left end 31L and a right end 31R of the front unit 31 are curved in an arch shape on the rear side when viewed from the upper side. The imaging device 8 is disposed at the right end 31R. The side surface unit 32R extends backward from the right end 31R and the side surface unit 32L extends backward from the left end 31L.

The side surface unit 32R is combined with the case member 4R to form the accommodation unit HPR that includes an accommodation space S (see FIGS. 5 and 6) in which the right image projection unit 91 and the control unit 96 forming the optical device 9R are accommodated inside.

Similarly, the side surface unit 32L is combined with the case member 4L to form the accommodation unit HPL that includes an accommodation space S in which the left image projection unit 91 and the control unit 96 forming the optical device 9L are accommodated inside.

The side surface units 32R and 32L and the case members 4R and 4L will be described in detail below.

Configuration of Optical Device

Figure 4:
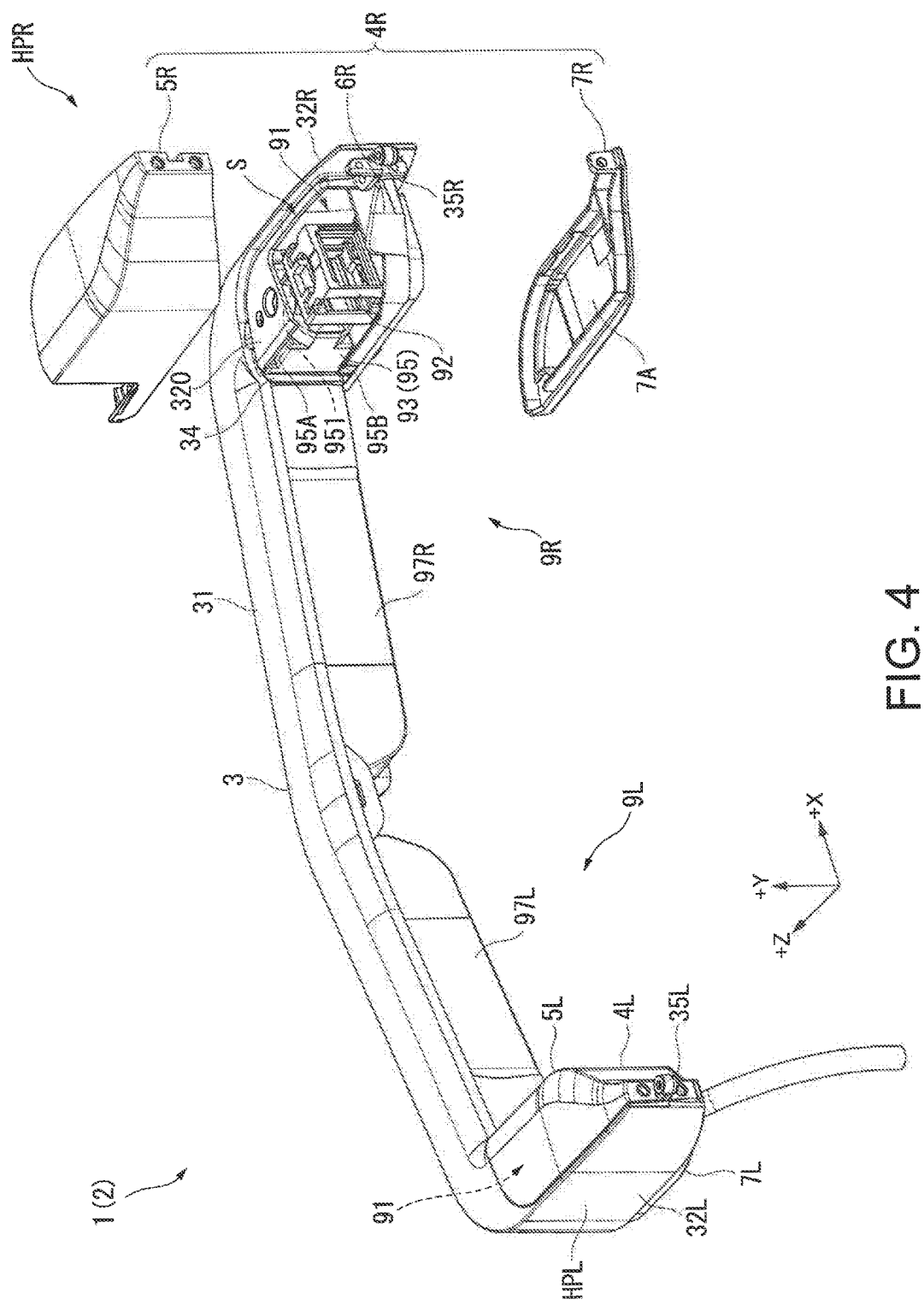
FIG. 4 is a perspective view illustrating the HMD from which an upper case and a lower case are removed according to the embodiment.
Figure 5:
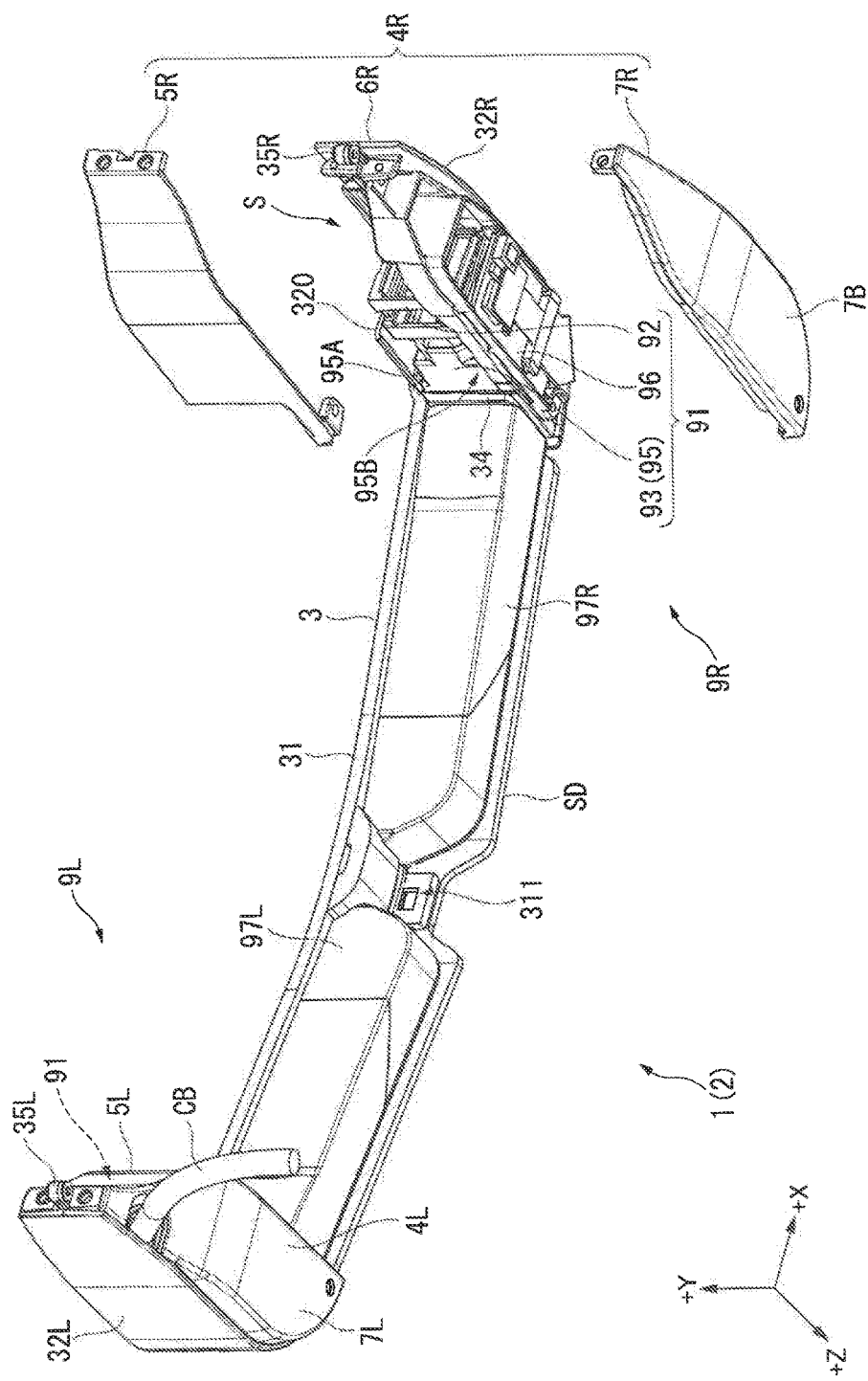
FIG. 5 is a perspective view illustrating the HMD from which the upper case and the lower case are removed according to the embodiment.

FIGS. 4 and 5 are perspective views illustrating the HMD 1 from which an upper case 5R and a lower case 7R included in the case member 4R are removed when viewed from the upper side on the rear surface side and the lower side on the rear surface side. In FIGS. 4 and 5, the temples TML and TMR are not illustrated.

The optical device 9R is located on the right side of the frame 2 and the optical device 9L is located on the left side of the frame 2. The optical devices 9R and 9L display images according to image signals input from the outside so that the user can view the images. Of the optical devices, the optical device 9R includes the light-guiding member 97R held by the front unit 31 and the image projection unit 91 and the control unit 96 disposed in the accommodation unit HPR formed by combining the side surface unit 32R and the case member 4R, as illustrated in FIGS. 4 and 5.

In the following description, the optical device 9R will be mainly described. The optical device 9L is mirror-symmetric to the optical device 9R and includes the image projection unit 91, the control unit 96, and the light-guiding member 97L as in the optical device 9R.

Configuration of Image Projection Unit

Figure 6:
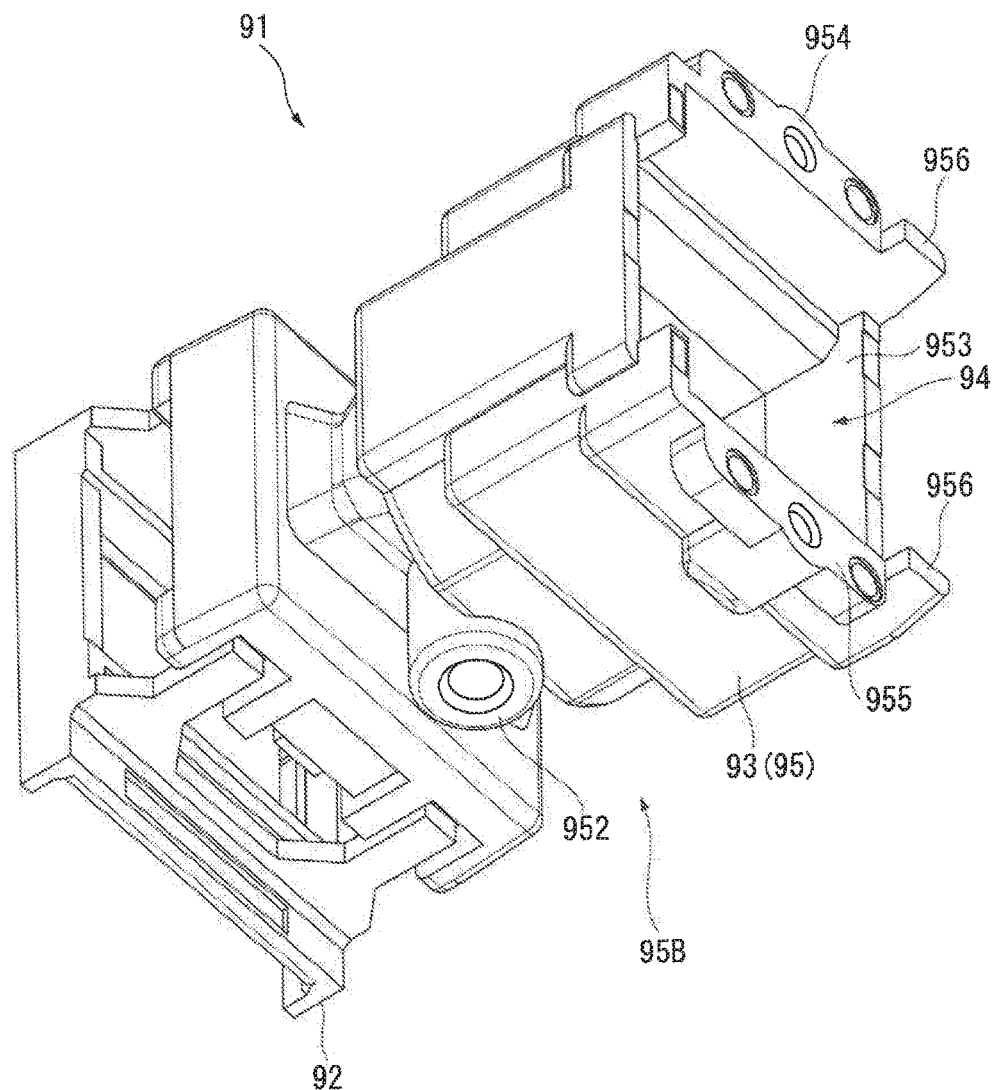
FIG. 6 is a perspective view illustrating an image projection unit according to the embodiment.

FIG. 6 is a perspective view illustrating the image projection unit 91 viewed from the lower side on a projection side (front surface side) of the image light. FIG. 6 illustrates a frame body of an image forming device 92 and a display panel is not illustrated.

The image projection unit 91 of each of the optical devices 9R and 9L projects image light (light forming an image) to each of the corresponding light-guiding members 97R and 97L and is one of the accommodated members which are accommodated in the corresponding accommodation units HPR and HPL. As illustrated in FIG. 6, the image projection unit 91 is configured as a unit in which the image forming device 92 and a projection optical device 93 are combined to be integrated.

The image forming device 92 is an image forming unit that forms image light according to an image signal input from the outside via a cable CB under the control of the control unit 96. In the embodiment, the image forming device 92 is configured with a self-luminous display panel such as an organic electro-luminescence (EL) panel. However, the invention is not limited thereto. The image forming device 92 can also be configured by combining a light source such as an LED and a light modulation device such as a device in which a transmissive or reflective liquid crystal panel or a micromirror such as an MEMS mirror is used.

The image forming device 92 and the frame body 3 (a fixing portion 320 or the side surface units 32R and 32L to be described below) are connected by a heat transmission member (not illustrated). Thus, heat generated in the image forming device 92 can be transmitted to the frame body 3 which is a member made of metal and exposed to the outside so that the heat can be released to the outside in the frame body 3.

The projection optical device 93 emits the image light formed by the image forming device 92 to each of the corresponding light-guiding members 97R and 97L. The projection optical device 93 is configured as a pair of lenses including a plurality of lenses 94 and a lens barrel 95 that accommodates the plurality of lenses 94. When the image light incident from the image forming device 92 can be guided to each of the light-guiding members 97R and 97L, a prism (projection prism) may be adopted instead of at least one of the plurality of lenses.

The lens barrel 95 includes a fixing portion 951 which is a screw hole in an upper end surface 95A, as illustrated in FIG. 4, and a fixing portion 952 which is a screw hole in a lower end surface 95B, as illustrated in FIG. 6. As illustrated in FIG. 4, the lens barrel 95 is fixed to a fixing portion 320 of the side surface unit 32R in the fixing portion 951. As illustrated in FIG. 5, a substrate holder 6R is mounted on the fixing portion 952 of the lens barrel 95. That is, the image projection unit 91 including the lens barrel 95 is covered by the substrate holder 6R from the lower side. Although not illustrated, the image projection unit 91 of the optical device 9L is also covered by a similar substrate holder from the lower side.

The lens barrel 95 includes an opening 953 at the end on a light emission side and the image light is projected from a lens (not illustrated) located inside the opening 953. An upper protrusion 954 and a lower protrusion 955 are formed in the circumference of the opening 953. An incidence portion 971 of the light-guiding member 97 is disposed in a region surrounded by the upper protrusion 954 and the lower protrusion 955. Specifically, in the region, an incidence surface 9711 of the incidence portion 971 of the light-guiding member 97 is disposed to face the opening 953. Thus, the image light emitted via the opening 953 travels inside the light-guiding member 97 via the incidence surface 9711.

Further, when the lens barrel 95 is disposed inside the accommodation unit HPR, each of the upper protrusion 954 and the lower protrusion 955 includes an extension portion 956 extending in the +Z direction. The extension portion 956 is formed in a substantially rectangular plate shape and a frame body 341 (an end edge of an opening 342) of a waterproof member 34 to be described below comes into contact the extension portion 956.

The control unit 96 included in the optical device 9L operates the image forming device 92 included in the optical device 9L according to an image signal supplied from the outside via the cable CB connected to the left accommodation unit HPL. The control unit 96 included in the optical device 9R operates the image forming device 92 included in the optical device 9R according to an image signal input from the control unit 96 of the optical device 9L via a signal line (not illustrated) passing between the front unit 31 and the light-guiding members 97R and 97L. The control unit 96 is also one of the accommodated members which are accommodated in each of the accommodation units HPR and HPL.

A control circuit that controls the imaging device 8 is mounted on the control unit 96 of the optical device 9R.

Configuration of Light-Guiding Member

Each of the right light-guiding member 97R and the left light-guiding member 97L is included in the optical member according to the invention. The light-guiding members 97R and 97L are disposed in front of the right and left eyes of the user and guide the image light emitted from the corresponding image projection units 91 to the right and left eyes of the user.

Specifically, the light-guiding member 97R reflects the right eye image light projected from the image projection unit 91 of the optical device 9R internally from a boundary surface, travels the image light toward the center side, and guides to the right eye in accordance with a semitransmissive layer formed at a position appropriate for the right eye of the user. The same also applies to the light-guiding member 97L that guides the left eye image light to the left eye.

Each of the light-guiding members 97L and 97R is formed of a resin that exhibits high light transparency in a visible light region (for example, a cycloolefin polymer). Therefore, the user can observe the external world via the light-guiding members 97R and 97L disposed in front of the right and left eyes.

Figure 7:
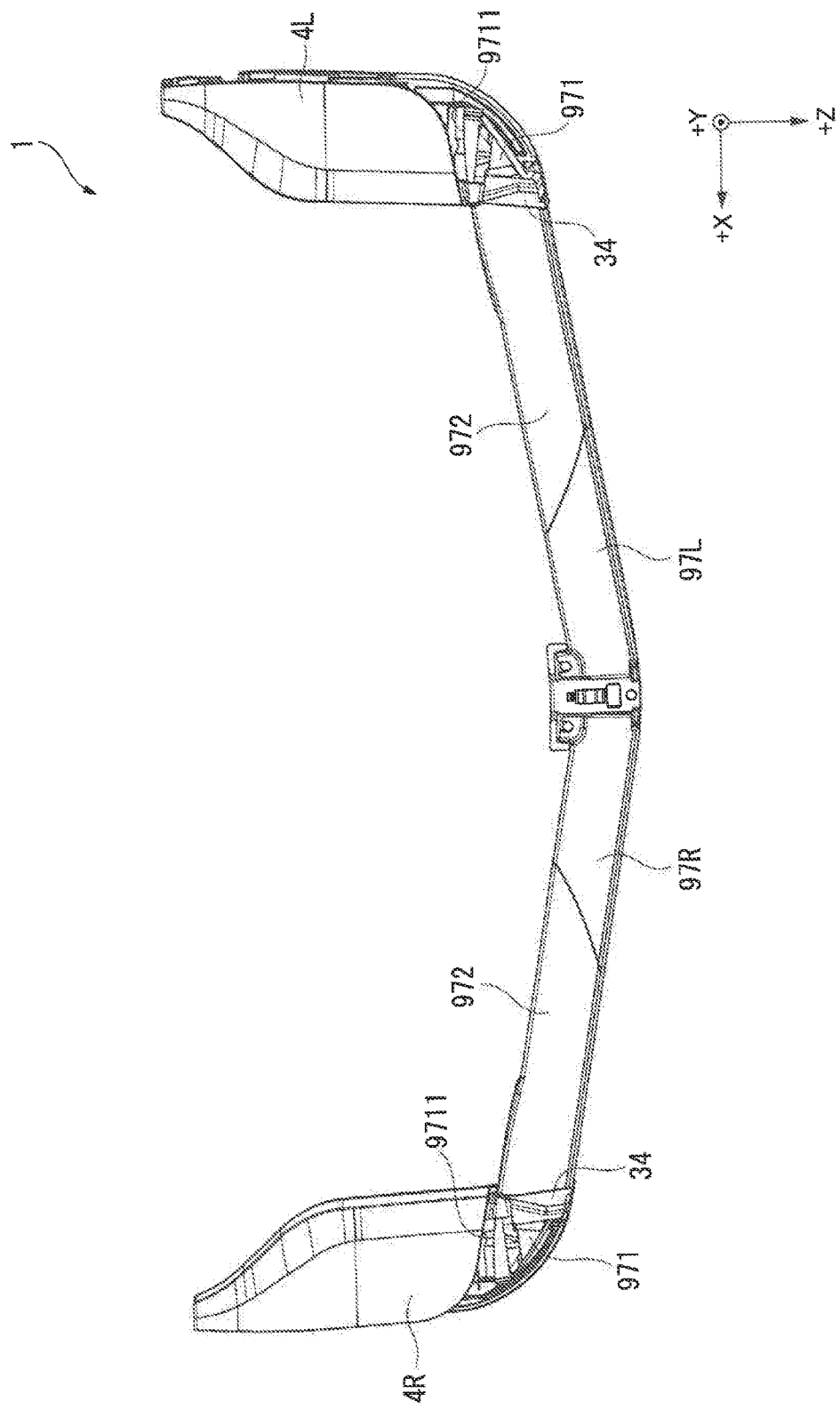
FIG. 7 is a plan view illustrating the HMD from which a frame body is removed according to the embodiment.
Figure 8:
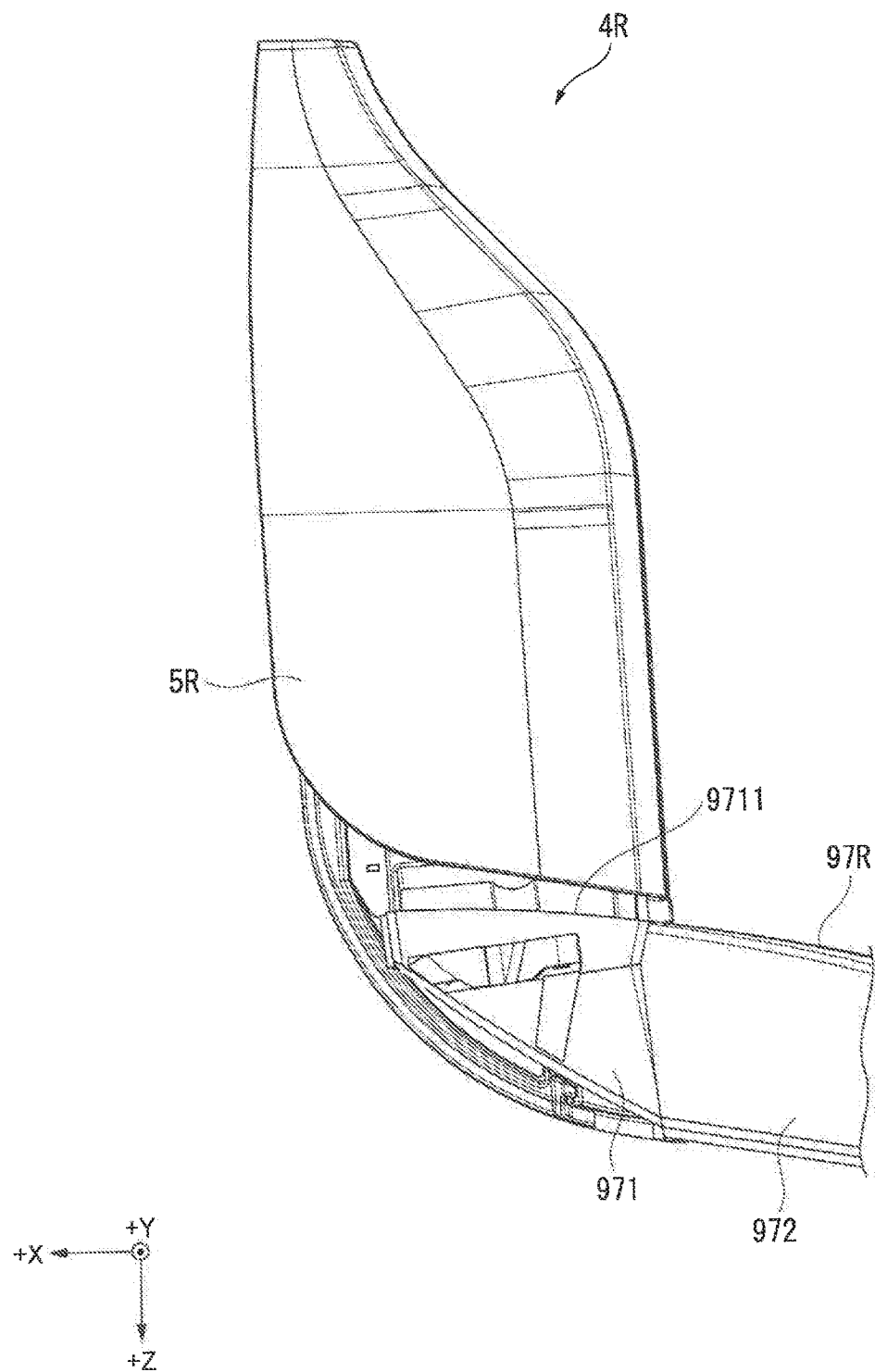
FIG. 8 is a plan view illustrating the HMD from which the frame body and a waterproof member are removed according to the embodiment.

FIG. 7 is a plan view illustrating the HMD 1 from which the frame body 3 is removed when viewed in the +Y direction. FIG. 8 is an enlarged view illustrating the case member 4R in the HMD 1 from which the waterproof member 34 in FIG. 7 is removed.

As illustrated in FIGS. 7 and 8, each of the light-guiding members 97R and 97L includes the incidence portion 971 and a light-guiding portion 972. Of the portions, the incidence portion 971 is formed in a substantially trigonal prism. The incidence portion 971 includes the incidence surface 9711 on which the image light projected from the image projection unit 91 is incident.

The incidence surface 9711 is configured with an end surface of the incidence portion 971 in the Z direction. The incidence surface 9711 is disposed to face a lens inside the opening 953 of the lens barrel 95. Thus, the image light projected from the image projection unit 91 is incident on the incidence surface 9711. Then, the image light incident from the incidence surface 9711 travels inside the incidence portion 971, is repeatedly reflected to travel inside the light-guiding portion 972, emits from the surface of the light-guiding portion 972 in the Z direction, and is guided to each of the right and left eyes of the user.

As will be described below, the waterproof member is installed in the incidence portion 971 of the light-guiding member 97.

Configuration of Side Surface Unit

Figure 9:
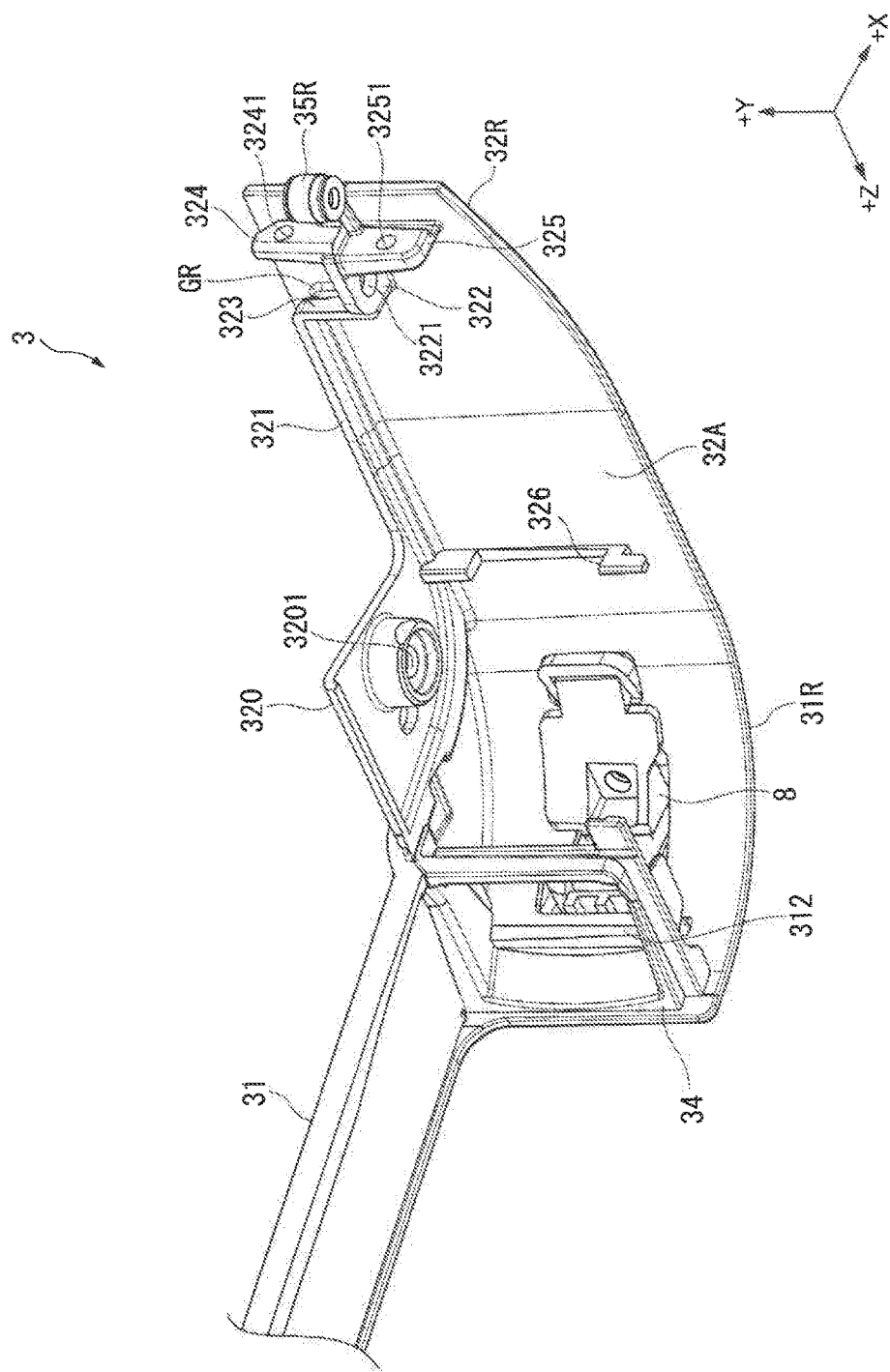
FIG. 9 is a perspective view illustrating the frame body according to the embodiment.

FIG. 9 is a perspective view illustrating an inner surface 32A of the side surface unit 32R included in the frame body 3 when viewed from the lower side on the rear surface side.

The frame body 3 is equivalent to a frame member according to the invention. The frame body 3 includes the front unit 31 and the right and left side surface units 32R and 32L, as described above.

As illustrated in FIG. 9, the side surface unit 32R includes the fixing portion 320 that is erect from the inner surface 32A on the user side and is connected to the upper surface of the right end 31R and ribs 321 to 325 that serve as a second rib and are similarly erect from the inner surface 32A.

The fixing portion 320 is located on the rear surface side from the right end 31R of the front unit 31 and a portion lowered downward from the upper end surface of the front unit 31. The fixing portion 320 is a planar portion in the horizontal direction (a planar portion in the XZ plane).

The fixing portion 320 includes a hole 3201 into which a screw screwed to the fixing portion 951 of the lens barrel 95 disposed on the lower side of the fixing portion 320 from the upper side is inserted.

The fixing portion 320 protrudes from the inner surface 32A of the side surface unit 32R, and thus can also be said to be a rib which considerably protrudes.

Although not illustrated, the side surface unit 32L also includes the same fixing portion 320.

The ribs 321 and 322 extend from the front unit 31 in an extension direction of the side surface unit 32R. Specifically, the rib 321 continues with the fixing portion 320 at a position near the upper end of the side surface unit 32R and extends up to a position near the end on the rear surface side. That is, the rib 321 extends in conjunction with the fixing portion 320 from the end of the side surface unit 32R on the front surface side to the rear surface side in the extension direction of the side surface unit 32R from the front unit 31.

The rib 322 is formed in a substantial middle of the side surface unit 32R in the vertical direction and at a position on the rear surface side.

The ribs 323 to 325 extend in a direction (second direction) substantially perpendicular to the extension direction of the side surface unit 32R from the front unit 31. Specifically, the rib 323 connects the end of the rib 321 on the rear surface side to the end of the rib 322 on the front surface side. The rib 324 extends upward from an end of the rib 322 on the rear surface side and the rib 325 extends downward from the end. The ribs 324 and 325 are connected to the holding unit 35R held so that the temple TMR is rotatable. That is, the holding unit 35R is integrated with the side surface unit 32R.

The ribs 321 to 325 have a function of enhancing rigidity of the side surface unit 32R.

Of the ribs, the ribs 322, 324, and 325 include case fixing portions that fix the case member 4R.

Specifically, a case fixing portion 3221 included in the rib 322 is a hole into which a screw, which is inserted into the substrate holder 6R and screwed in a screw hole (not illustrated) of the upper case 5R, is inserted.

A case fixing portion 3241 included in the rib 324 is a screw hole in which a screw inserted into the upper case 5R is screwed from the rear surface side.

A case fixing portion 3251 included in the rib 325 is a screw hole in which a screw inserted into the upper case 5R and the lower case 7R is screwed.

In this way, the ends of the upper case 5R, the substrate holder 6R, and the lower case 7R on the rear surface side are fixed to the ribs 322, 324, and 325 located on the rear surface side in the side surface unit 32R.

Configuration of Case Member

The case member 4R combined with the side surface unit 32R to form the accommodation unit HPR includes the upper case 5R, the substrate holder 6R, and the lower case 7R, as illustrated in FIGS. 4 and 5.

The case member 4L combined with the side surface unit 32L to form the accommodation unit HPL also includes an uppercase 5L, a substrate holder (not illustrated), and a lower case 7L that has a mirror-symmetric structure with the upper case 5R, the substrate holder 6R, and the lower case 7R.

Figure 13:
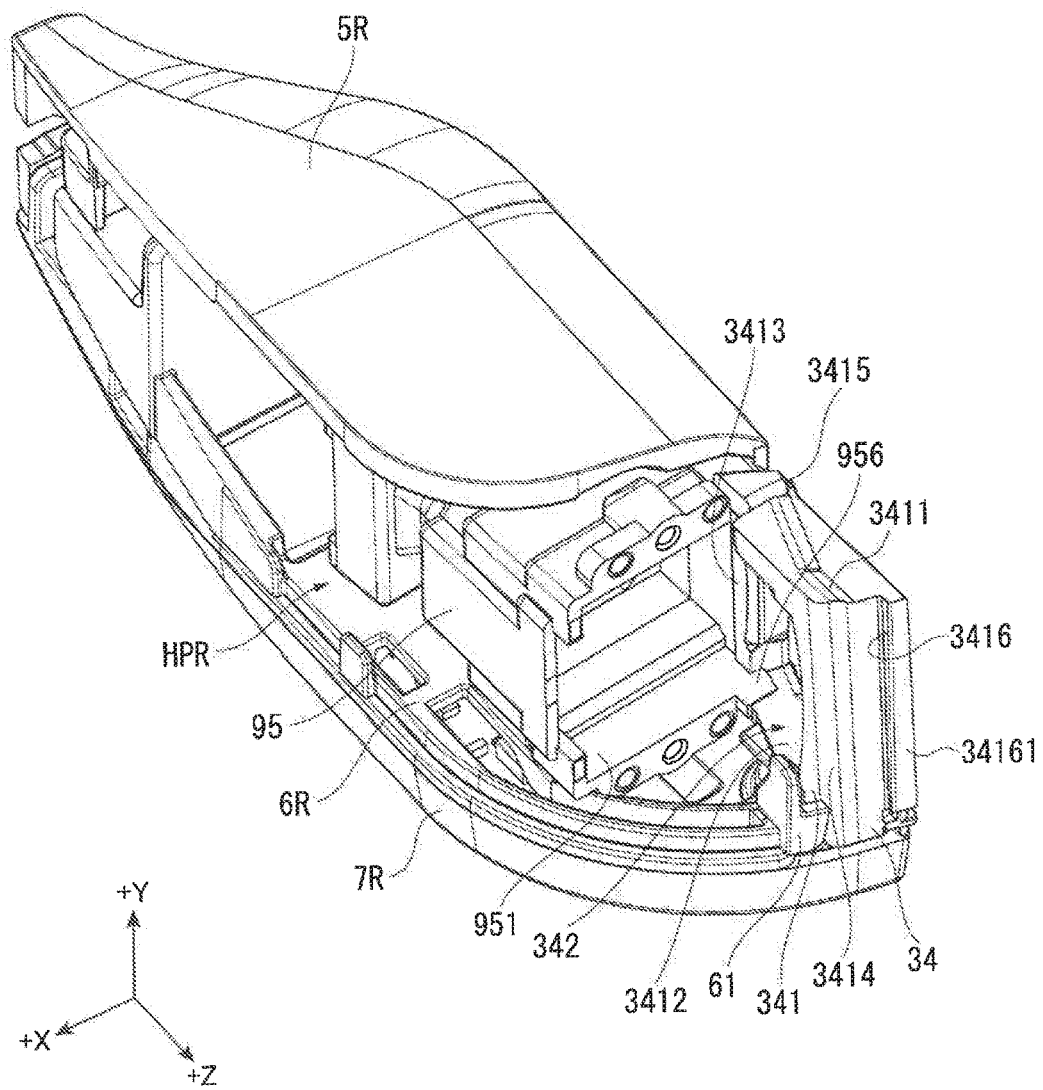
FIG. 13 is a perspective view illustrating disposition of the waterproof member according to the embodiment.

Of these elements, the substrate holder 6R includes a protrusion 61 that protrudes in the +Y direction (see FIG. 13). The protrusion 61 comes into contact with the frame body 341 of the waterproof member 34 to be described below.

Configuration of Circumference of Light-Guiding Member

Figure 10:
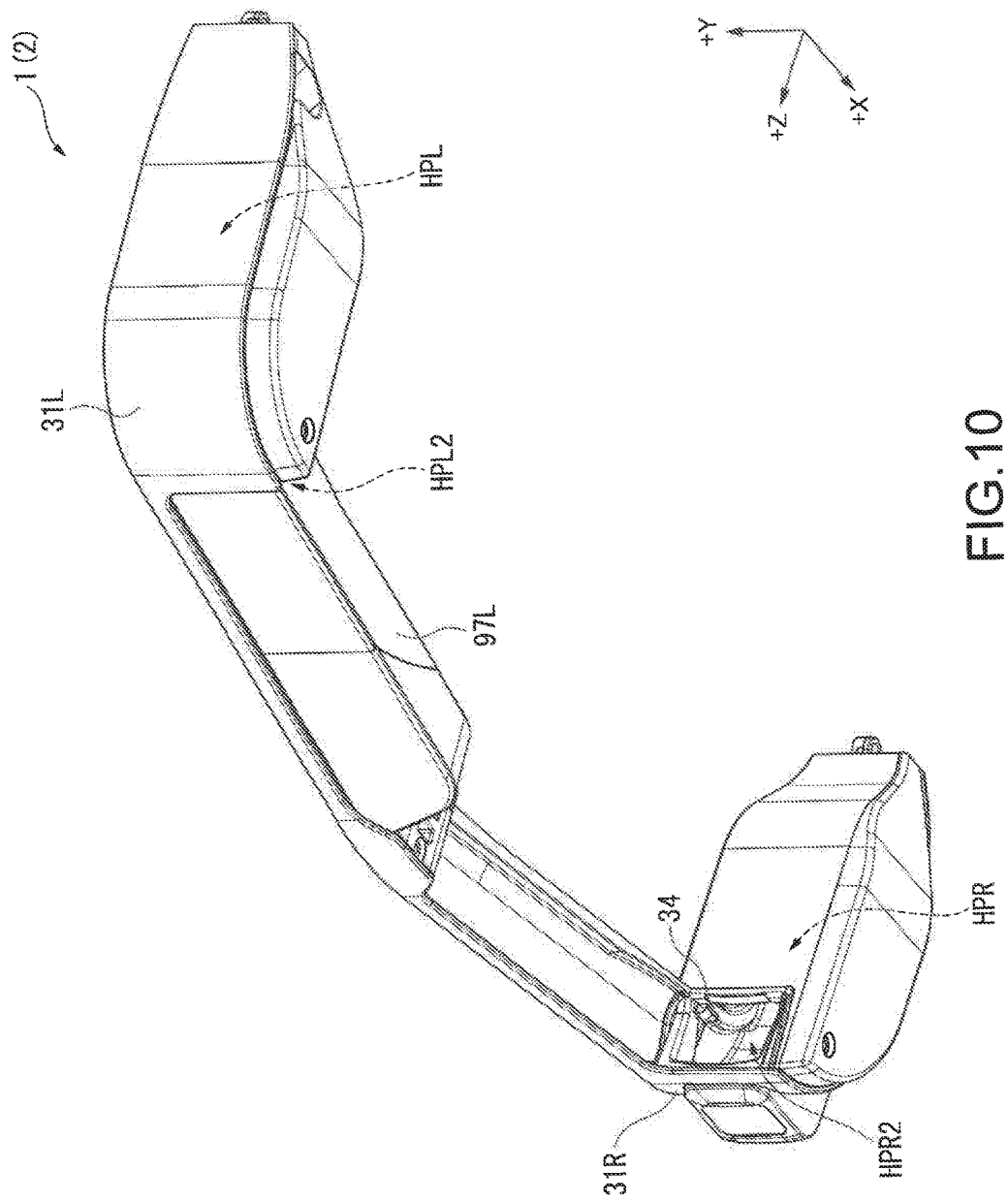
FIG. 10 is a perspective view illustrating the HMD from which a right-side light-guiding member is removed according to the embodiment.

FIG. 10 is a perspective view illustrating the HMD 1 from which the light-guiding member 97R is removed when viewed in the −Y direction. In FIG. 10, the temples TMR and TML are not illustrated.

The end (the incidence portion 971) of the light-guiding member 97R in the +X direction is disposed inside the accommodation unit HPR to cause an image projected from the image projection unit 91 disposed in the accommodation unit HPR to be incident. Therefore, when the upper case 5R is combined with the side surface unit 32R, as illustrated in FIG. 10, an opening HPR2 into which an end on the right side is inserted is formed by the front unit 31 and a substantial L-shaped portion formed on the front surface side in the upper case 5R. Therefore, the inner surface 32A of the side surface unit 32R is equivalent to an inner surface of an opening according to the invention.

Although description and illustration are omitted, the end (the incidence portion 971) on the X direction is disposed inside the opening HPL2 as in the light-guiding member 97L or the light-guiding member 97R.

The waterproof member 34 is disposed inside the opening HPL2. Specifically, the waterproof member 34 is located near an opening edge of the opening HPL2 and the incidence portion 971 of the light-guiding member 97 is inserted into the opening 342 (an insertion portion) of the waterproof member 34.

Configuration of Waterproof Member

Figure 11:
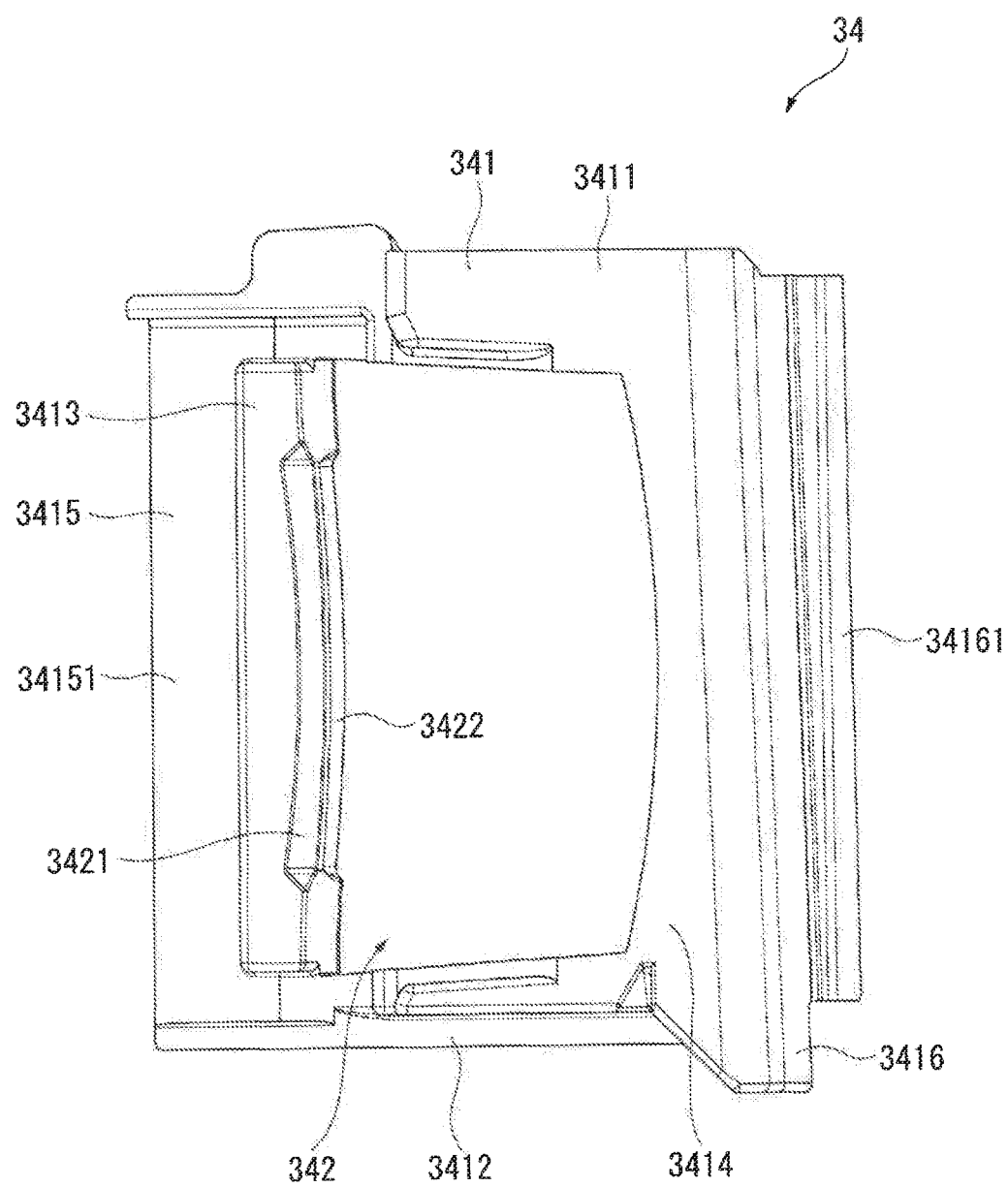
FIG. 11 is a perspective view illustrating the waterproof member when viewed from the inside according to the embodiment.
Figure 12:
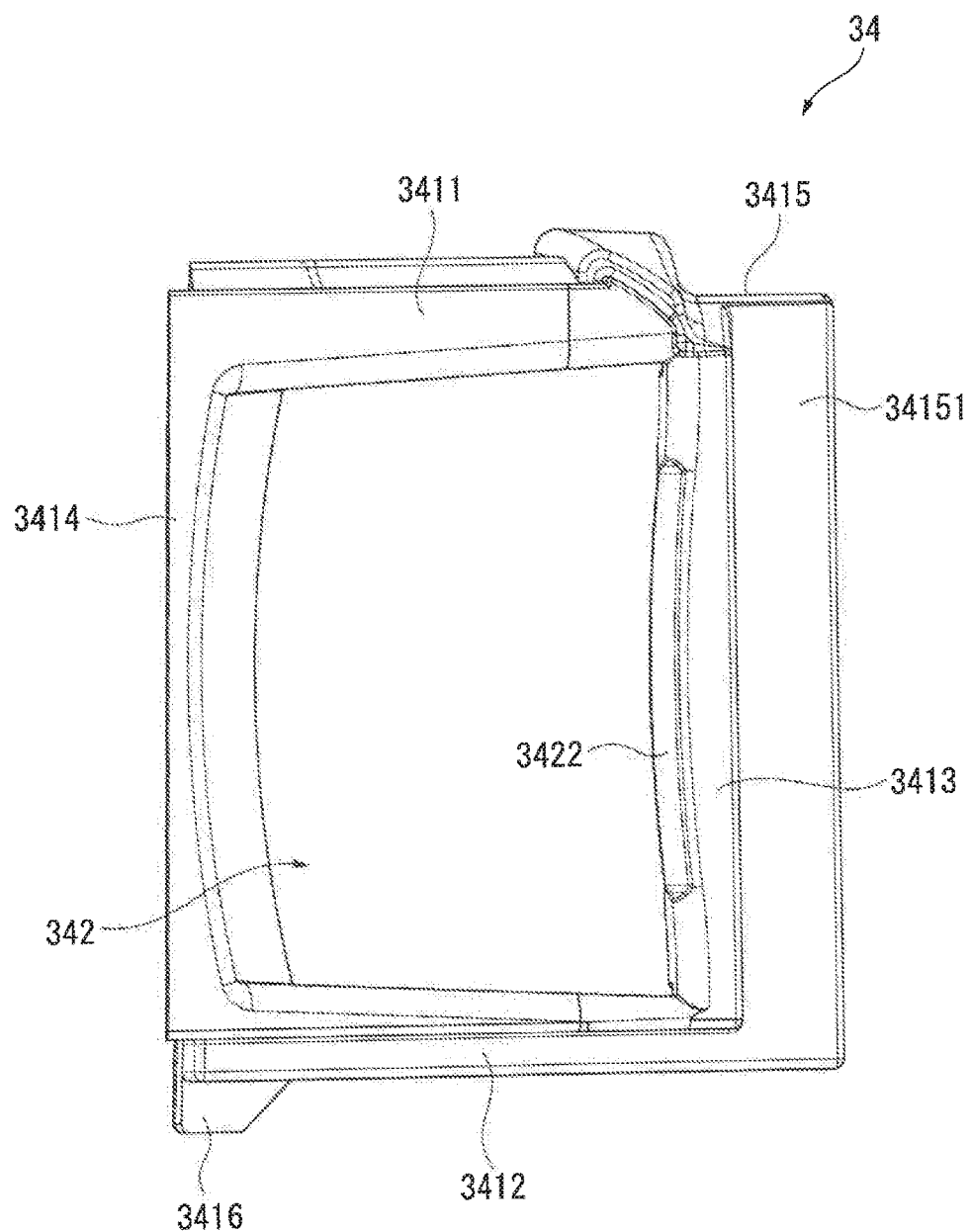
FIG. 12 is a perspective view illustrating the waterproof member when viewed from the outside according to the embodiment.

FIG. 11 is a perspective view illustrating the waterproof member 34 when viewed from the side of the frame body 3. FIG. 12 is a perspective view illustrating the waterproof member when viewed from the side of the light-guiding member 97. That is, FIG. 11 is a plan view illustrating the waterproof member 34 when viewed in the +X direction in a case in which the waterproof member 34 is located inside the opening HPR2 and FIG. 12 is a plan view illustrating the waterproof member 34 when viewed in the X direction.

The waterproof member 34 is located inside the accommodation unit HPR. The waterproof member 34 is a portion located inside each of the case members 4R and 4L of the light-guiding members 97, that is a frame-shaped member that surrounds the circumference of the incidence portion 971. In other words, the waterproof member 34 is formed in a portion within a predetermined range from the opening end of the opening HPR2. The waterproof member 34 is formed of, for example, a silicon resin.

As illustrated in FIGS. 11 and 12, the waterproof member 34 includes the frame body 341 and the opening 342. The frame body 341 is a substantially rectangular frame body. The frame body 341 includes a first end 3411, a second end 3412, a third end 3413, and a fourth end 3414 formed in the end edge of the opening 342.

That is, the frame body 341 is configured to include the first end 3411, the second end 3412, the third end 3413, and the fourth end 3414. The substantial rectangular opening 342 is formed in a substantial middle of the frame body 341.

Of these ends, the first end 3411 is a portion located in the +Y direction when the waterproof member 34 is disposed inside the accommodation unit HPR. The second end 3412 is a portion located at a position facing the first end 3411, that is, located in the Y direction when the waterproof member 34 is disposed inside the accommodation unit HPR.

The third end 3413 is a portion located on the side of the lens barrel 95 (in the Z direction) when the waterproof member 34 is disposed inside the accommodation unit HPR. An extension portion 3415 extending in the opposite direction to the opening 342 from the end of the third end 3413 is connected to the third end 3413. The extension portion 3415 includes a planar portion 34151. The planar portion 34151 has a function of positioning the waterproof member 34 when the waterproof member 34 is disposed inside the accommodation unit HPR.

The fourth end 3414 is a portion located at a position facing the third end 3413, that is, located in the +Z direction when the waterproof member 34 is disposed inside the accommodation unit HPR. A protrusion 3416 extending in the +Z direction from the end of the fourth end 3414 is connected to the fourth end 3414. The protrusion 3416 is a portion close to the inner surface 32A of the side surface unit 32R when the waterproof member 34 is disposed inside the accommodation unit HPR and includes an end surface 34161 facing the inner surface 32A.

The opening 342 is a substantially rectangular opening that is formed in a substantial middle of the frame body 341. Two notches 3421 and 3422 are formed in the left end edge when the opening 342 is viewed in the opposite direction to the user (observer), that is, the third end 3413. Of the notches, the notch 3421 is located in the Z direction more than the notch 3422 (on the side of the lens barrel 95) when the waterproof member 34 is disposed inside the accommodation unit HPR.

The notch 3421 is notched in the Z direction and the notch 3422 is notched in the Z direction when the waterproof member 34 is disposed inside the accommodation unit HPR. The notches 3421 and 3422 are formed according to the sectional shape of the incidence surface 9711 of the incidence portion 971. Therefore, when the waterproof member 34 is mounted on the light-guiding member 97 inside the accommodation unit HPR, the incidence portion 971 of the light-guiding member 97 comes into contact with the notch 3422. The notch 3422 is formed substantial parallel to the incidence surface 9711 of the incidence portion 971 to hold the incidence surface 9711.

Here, the incidence surface 9711 of the light-guiding member 97 guides the image light into the light-guiding member 97 by totally reflecting the image light incident via the incidence surface 9711. Therefore, a contact area of the waterproof member 34 with the incidence surface 9711 of the light-guiding member 97 is preferably small.

In the embodiment, the dimension of the notch 3422 at the third end 3413 in the +X direction is set to be smaller than dimensions in the +X direction in the other ends 3411, 3412, and 3414. In this way, an influence of the image light on light guidance is reduced by reducing a region of the incidence surface 9711 of the light-guiding member 97 coming into contact with the waterproof member 34. That is, when the third end 3413 has the foregoing configuration, light guidance of the image light by the incidence surface 9711 is ensured.

FIG. 13 is a perspective view illustrating disposition of the waterproof member 34 and the lens barrel 95 in the accommodation unit HPR.

In the waterproof member 34, as illustrated in FIG. 13, the extension portion 3415 comes into contact with a side surface of the lens barrel 95 on the user side when the waterproof member 34 is disposed inside the accommodation unit HPR. Specifically, the extension portion 3415 includes the planar portion 34151 that extends in the Z direction when the waterproof member 34 is disposed inside the accommodation unit HPR. The planar portion 34151 comes into contact with the side surface of the lens barrel 95 in the X direction. Thus, the third end 3413 (the extension portion 3415) of the waterproof member 34 in the +X direction is positioned, and further the end of the light-guiding member 97 in the +X direction on which the waterproof member 34 is mounted is positioned.

When the waterproof member 34 is disposed inside the accommodation unit HPR, the lower end surface of the second end 3412 comes into contact with the upper end surface of the substrate holder 6R located in the +Y direction. The extension portion 956 of the lens barrel 95 comes into contact with the upper end surface of the second end 3412 in the +Y direction. Specifically, as illustrated in FIG. 13, the extension portion 956 comes into contact with the upper end surface of the second end 3412 located in the Z direction. Thus, movement of the waterproof member 34 in the +Y direction is regulated.

The end of the extension portion 956 in the Z direction comes into contact with the third end 3413 of the frame body 341. Thus, the third end 3413 (the frame body 341) of the waterproof member 34 is positioned, and further the end of the light-guiding member 97 in the −Y direction on which the waterproof member 34 is mounted is positioned.

Figure 14:
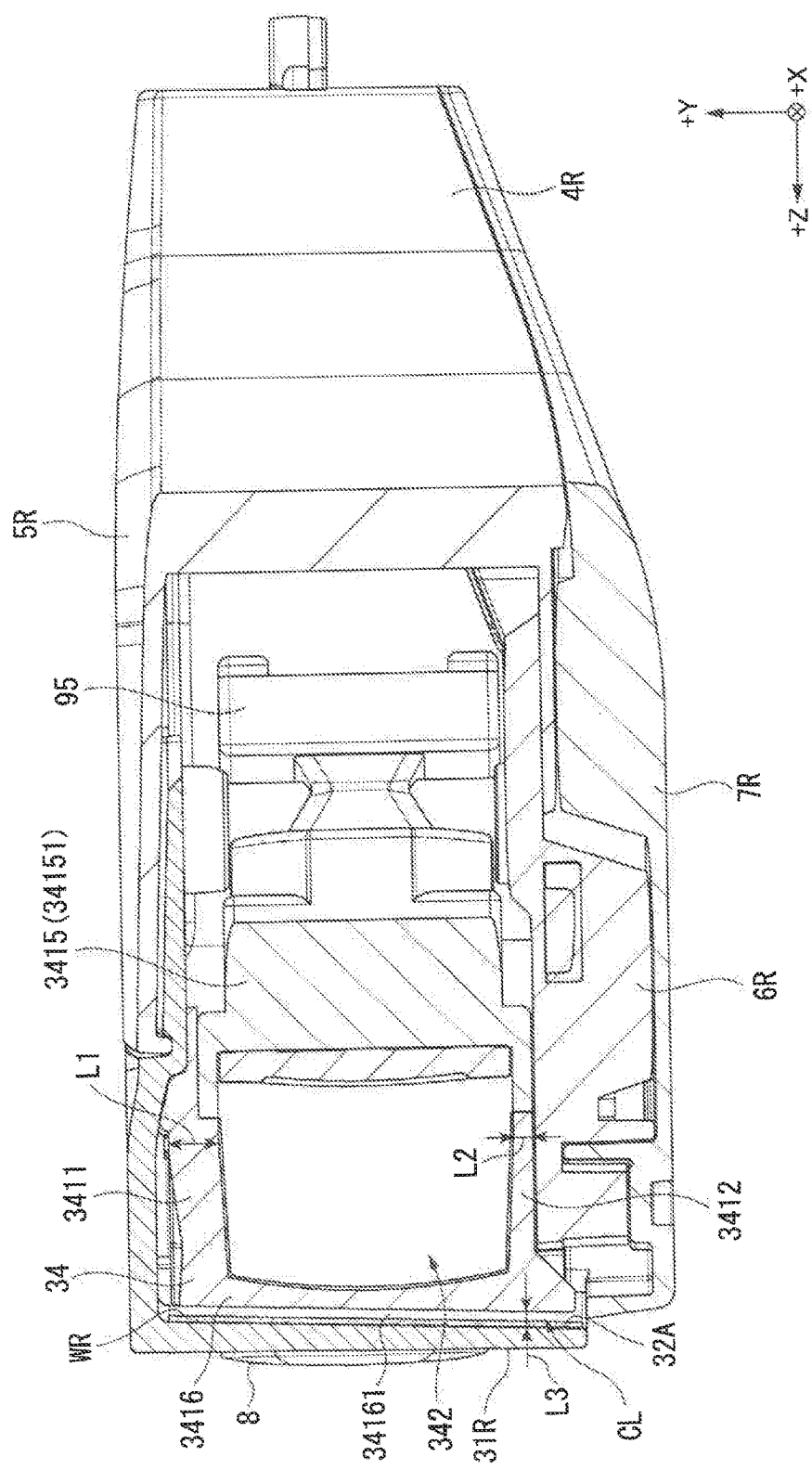
FIG. 14 is a sectional view illustrating a case member according to the embodiment.

FIG. 14 is a sectional view illustrating a cross section of the case member 4R taken along the line A1-A1 illustrated in FIG. 1.

As illustrated in FIG. 14, a thickness dimension L1 (a dimension in the +Y direction) of the first end 3411 is thicker than a thickness dimension L2 of the second end 3412. In other words, the thickness dimension L2 of the second end 3412 equivalent to a portion of the waterproof member 34 on the incidence surface side is thinner than the thickness dimension L1 of the first end 3411 which is another portion.

Here, in a case in which a portion (the second end 3412) of the waterproof member 34 on the incidence surface side is relatively thick, a deformation amount of the second end 3412 is increased due to thermal expansion or the like, and further there is a possibility that the position of the light-guiding member 97 at which the waterproof member 34 is installed is deviated.

However, the second end 3412 is thinner than the other portion (the first end 3411). Therefore, even in a case in which the portion is deformed, a deformation amount of the second end 3412 can be decreased. Thus, it is possible to reduce a possibility of the position of the light-guiding member 97 being deviated.

As described above, the protrusion 3416 is a portion close to the inner surface 32A of the side surface unit 32R when the waterproof member 34 is disposed inside the accommodation unit HPR, as illustrated in FIGS. 11 and 12. Specifically, the protrusion 3416 is a plate-shaped portion that extends in the +Z direction when the waterproof member 34 is disposed inside the accommodation unit HPR. The end surface 34161 of the protrusion 3416 in the +Z direction and the inner surface 32A of the side surface unit 32R are disposed to be substantially parallel to each other. A slight gap CL is formed between the end surface 34161 and the inner surface 32A, as illustrated in FIG. 14. A dimension L3 of the gap CL is preferably in the range of 0.1 mm to 0.001 mm. In the embodiment, the dimension L3 of the gap CL is set to 0.006 mm.

Here, as described above, when the end surface 34161 of the protrusion 3416 comes into contact with the inner surface 32A in addition to the first end 3411, the second end 3412, and the third end 3413 (the extension portion 3415) of the waterproof member 34, the entire surface of the waterproof member 34 comes into contact with the inner surfaces of the case members 4R and 4L. The light-guiding member 97 may be moved from a position to which the image light can be reliably guided due to the waterproof member 34 or the entire optical system may be moved even when the position of the image projection unit 91 is not moved with respect to the light-guiding member 97.

Thus, in the embodiment, different surfaces (the first end 3411, the second end 3412, and the extension portion 3415) from the end surface 34161 which is a surface facing the water repellent layer WR in the waterproof member 34 come into contact with the inner surfaces of the case members 4R and 4L (the upper case 5R, the substrate holder 6R, and the lens barrel 95 disposed inside the accommodation unit HPR of the case members 4R and 4L), and the gap CL is formed between the end surface 34161 and the inner surface 32A. Therefore, since the protrusion 3416 of the waterproof member 34 is not pressed in, for example, the Z direction by the inner surface 32A, the light-guiding member 97 in which the waterproof member 34 is installed is suppressed from being moved from the position. Further, even in a case in which the entire optical system is moved, a deviation in image display on the right and left sides can be suppressed.

The water repellent layer WR is formed in the gap CL.

Configuration of Water Repellent Layer

The water repellent layer WR suppresses infiltration of a fluid such as water into the accommodation unit HPR from the gap CL formed between the end surface 34161 and the inner surface 32A. In the embodiment, the water repellent layer WR is formed on the inner surface 32A of the side surface unit 32R. Specifically, as illustrated in FIG. 14, the water repellent layer WR is formed from the upper end to the lower end of the inner surface 32A without a gap.

The water repellent layer WR is formed by coating the inner surface 32A with a coating agent having a water repellent property (for example, a grease containing a fluoropolymer). That is, the water repellent layer WR is configured by coating the inner surface 32A with a grease in the +Y direction.

A contact angle of the water repellent layer WR is preferably equal to or greater than 90 degrees. In the embodiment, a contact angle of the water repellent layer WR is set to 114 degrees.

The grease which is the coating agent has a quick drying property, and thus, for example, is dried within 1 minute after the coating and becomes the water repellent layer WR. Although not illustrated, not only the inner surface 32A but also the vicinities of the contact surfaces of various cases are coated with the grease.

Figure 15:
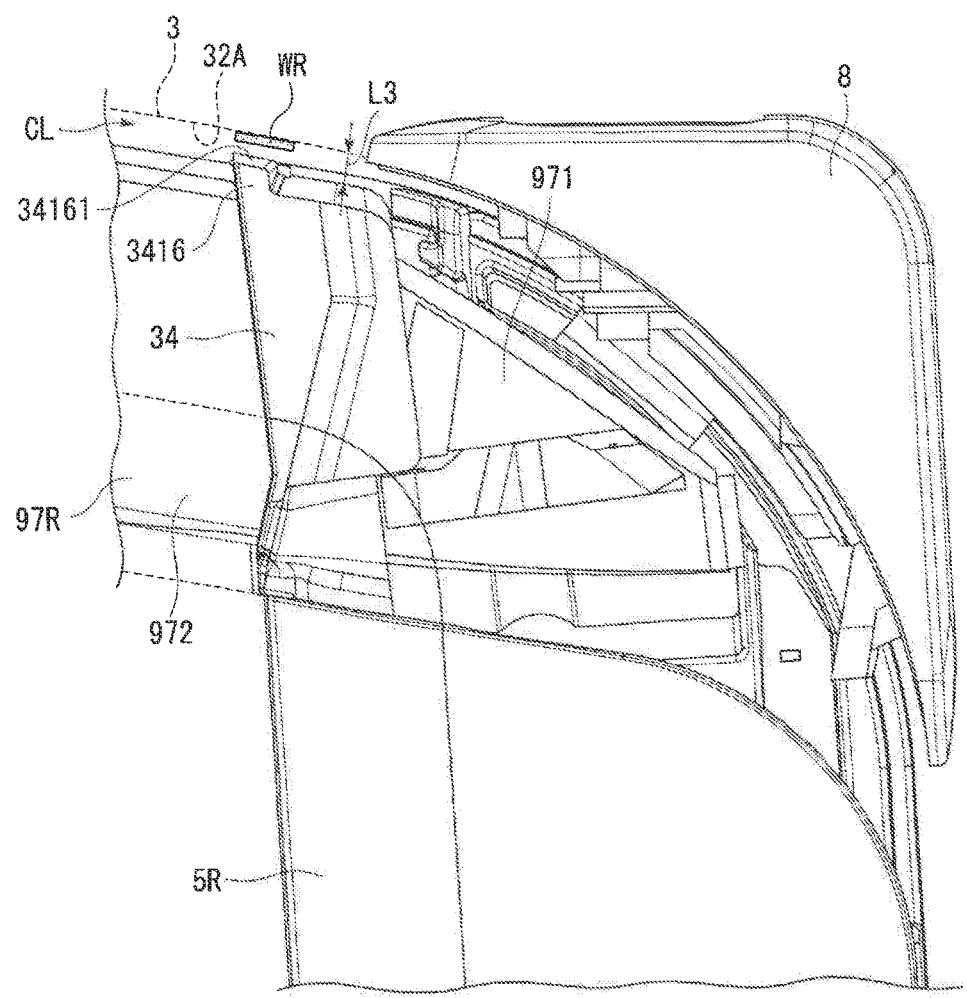
FIG. 15 is a plan view illustrating the position of a drainage layer according to the embodiment.

FIG. 15 is a diagram illustrating a position relation of the water repellent layer WR with respect to the waterproof member 34 when viewed in the +Y direction. In FIG. 15, the frame body 3 is indicated by a dotted line to easily understand the position of the water repellent layer WR.

As illustrated in FIG. 15, the water repellent layer WR is formed at a position facing the end surface 34161 of the protrusion 3416 on the inner surface 32A. Thus, in a case in which a fluid such as water infiltrates between the inner surface 32A and the end surface 34161 of the protrusion 3416 of the waterproof member 34 due to capillarity, the fluid becomes a droplet due to a water repellent effect of the water repellent layer WR. For example, the droplet generated due to the water repellent effect has a diameter greater than the gap between the water repellent layer WR and the end surface 34161. Thus, the droplet is suppressed from infiltrating into the gap due to the water repellent layer WR.

Advantages of Embodiment

The HMD 1 according to the above-described embodiment has following advantages.

Since the water repellent layer WR is disposed between the light-guiding member 97 and the inner surface 32A of the opening HPR2 (the side surface unit 32R) formed in each of the case members 4R and 4L, the fluid infiltrating the gap CL, formed between the light-guiding member 97 and the inner surface 32A of the opening HPR2 due to capillarity becomes a droplet due to the water repellent effect of the water repellent layer WR. There is a possibility that, for example, the droplet generated due to the water repellent effect is greater than the diameter of the dimension L3 of the gap CL. Therefore, the droplet is suppressed from infiltrating the gap CL by the water repellent layer WR. Accordingly, since the fluid such as water can be suppressed from infiltrating into each of the case members 4R and 4L (the accommodation unit HPR) holding the light-guiding member 97 by the water repellent layer WR, the water proof property of the HMD 1 can be improved.

Even when the gap CL is formed, the infiltration of the fluid into the accommodation unit HPR can be suppressed. Therefore, the light-guiding member 97R can be disposed so that the light-guiding member 97R does not come into contact with the inner surface 32A of the opening HPR2. Thus, at the time of assembling the HMD 1, stress can be suppressed from being applied to the light-guiding member 97. Therefore, the deviation in the position of the light-guiding member 97 can be suppressed.

Here, to suppress movement of the waterproof member, it is considered that water is proof by disposing and pressing a grease between a packing (waterproof member) and each of the case members 4R and 4L. Even in this case, however, there is a high possibility of the grease attaching to the light-guiding member 97. When the grease is attached to the light-guiding member 97, the exterior of the light-guiding member 97 deteriorates.

In the embodiment, on the other hand, the water repellent layer WR is formed between the waterproof member 34 and the inner surface 32A. Therefore, the waterproof property can be realized while maintaining the exterior property of the light-guiding member 97.

Since the image projection unit 91 and the incidence surface 9711 of the light-guiding member 97 are located inside the accommodation unit HPR, a fluid such as water can be suppressed from infiltrating into the accommodation unit HPR by the water repellent layer WR. Therefore, the fluid can be reliably suppressed from being attached to the image projection unit 91 and the incidence surface 9711 of the light-guiding member 97R located inside the accommodation unit HPR. Thus, the image projected from the image projection unit 91 can reliably be incident on the incidence surface 9711 of the light-guiding member 97. Accordingly, it is possible to improve reliability of the HMD 1 that displays the image based on the image light.

The fluid can be suppressed from infiltrating into the accommodation unit HPR by the waterproof member 34 installed in the portion located inside the accommodation unit HPR in the light-guiding member 97. Since the water repellent layer WR is located on the waterproof member 34 and the inner surface 32A of each of the case members 4R and 4L (the side surface unit 32R), the fluid can be suppressed from infiltrating from the gap CL between the waterproof member 34 and the inner surface 32A of each of the case members 4R and 4L. Accordingly, the fluid can be reliably suppressed from infiltrating into the accommodation unit HPR more than in a case in which the waterproof member 34 is not installed.

Since the waterproof member 34 is installed in the circumference of at least a part of the incidence portion 971 located inside the accommodation unit HPR of the light-guiding member 97, the fluid can be suppressed from infiltrating into the accommodation unit HPR more than, for example, in a case in which a waterproof member is installed only in a part of the incidence portion 971.

For example, in a case in which the second end 3412 which is a portion of the waterproof member 34 on the incidence surface side is relatively thick, a deformation amount increases due to thermal expansion or the like of the second end 3412 and there is a high possibility of the waterproof member 34 coming into contact with each of the case members 4R and 4L (the inner surface 32A). Further, there is a possibility that the position of the light-guiding member 97 in which the waterproof member 34 is installed is deviated.

In the embodiment, however, the second end 3412 is thinner than the first end 3411. Therefore, even in a case in which the second end 3412 is deformed, the deformation amount of this portion can be reduced, and thus this portion is suppressed from coming into contact with each of the case members 4R and 4L. Accordingly, it is possible to reduce the possibility of the position of the light-guiding member 97 being deviated. Further, the image light can reliably be incident from the incidence surface 9711.

Since the water repellent layer WR is disposed between the waterproof member 34 (the gap CL) and the inner surface 32A opposite to the incidence surface 9711 of the light-guiding member 97 with the light-guiding member 97 interposed therebtween in the case members 4R and 4L, the fluid can be suppressed from infiltrating into the accommodation unit HPR from the gap CL.

Since the gap CL is present between the waterproof member 34 and the inner surface 32A of each of the case members 4R and 4L, the portion in the waterproof member 34 does not come into the inner surface 32A of each of the case members 4R and 4L. That is, since the surface opposite to the incidence surface from which the light incident from the incidence surface 9711 of the light-guiding member 97 is reflected does not come into contact with the inner surface 32A, the image light can reliably be reflected from this surface. Accordingly, it is possible to further improve the reliability of the HMD 1.

Since the different surface from the surface (the end surface 34161) in which the gap CL is formed in the waterproof member 34 comes into contact with the inner surface 32A of each of the case members 4R and 4L, the fluid can be suppressed from infiltrating into the accommodation unit HPR from the surface other than the end surface 34161 in which the gap CL is formed.

Since at least one surface (the surface opposite to the incidence surface 9711) of the light-guiding member 97 does not come into contact with the inner surface 32A of the frame body 3, movement of the waterproof member 34 to each of the case members 4R and 4L can be suppressed due to any pressure or stress.

Since the water repellent layer WR is located at a portion facing the waterproof member 34 in the inner surface 32A, the fluid can be reliably suppressed from infiltrating into the accommodation unit HPR from the gap CL between the inner surface 32A and the waterproof member 34. Since the water repellent layer WR is formed on the inner surface 32A, the water repellent layer WR can be easily disposed (attached) more than, for example, in a case in which the water repellent layer WR is formed in the waterproof member 34.

Since the waterproof member 34 is formed of a silicon resin, a fluid such as water can be suppressed from soaking in the waterproof member. Since a silicon resin has a water repellent property, the fluid can be reliably suppressed from infiltrating into the accommodation unit HPR due to the water repellent property of the water repellent layer WR and the waterproof member 34. Further, since heat resistance is high, the waterproof member 34 can be suppressed from deteriorating.

Since the water repellent layer WR is formed by a coating agent (grease) having a water repellent property, the position at which the water repellent layer WR is formed is coated with the coating agent (grease). Therefore, the water repellent layer WR can be easily formed on the inner surface 32A. Accordingly, since the water repellent layer WR can be easily configured, an assembly process for the HMD 1 can be simplified.

The coating agent (grease) contains a fluoropolymer. Therefore, when the fluid comes into contact with the water repellent layer WR formed of the coating agent, the fluid becomes a droplet and the droplet can remain on the water repellent layer WR. Accordingly, it is possible to further improve the water proof property of the HMD 1.

Therefore, the HMD 1 can be appropriately used even in an environment in which rainwater or the like falls.

Modifications of Embodiment

The invention is not limited to the foregoing embodiment and modifications, improvements, or the like within a scope in which the advantages of the invention are achieved are included in the invention.

In the foregoing embodiment, the waterproof member 34 is formed of a silicon resin. However, the invention is not limited thereto. For example, the waterproof member may also be formed of an elastic material having a water repellent property (for example, a rubber or a cushion not subject to sulfur vulcanization).

In the foregoing embodiment, the water repellent layer WR is formed by coating the inner surface 32A with a grease containing a fluoropolymer. However, the invention is not limited thereto. For example, the water repellent layer WR may be formed by coating the inner surface 32A with a grease containing a silicon polymer instead of a fluoropolymer or may be formed by coating the inner surface 32A with a grease containing a polyolefin polymer. That is, the water repellent layer WR may be formed of any material as long as the grease which is the coating agent has a water repellent property. The water repellent layer WR may be formed of a sealing material having a water repellent property.

The water repellent layer WR may be formed of a rubber member having a water repellent property, may be formed of a water repellent member having a water repellent property due to a minute structure, or may be formed by installing the minute structure in the case member 4 or the waterproof member 34.

In such a structure, by merely attaching the sealing material to the position at which the water repellent layer WR is formed, the water repellent layer WR can be formed inside each of the case members 4R and 4L. Accordingly, since the water repellent layer WR can be easily configured, assembly process for the HMD 1 can be simplified.

Further, the water repellent layer WR may be located in the waterproof member 34. In this case, the water repellent layer WR may be formed of the grease or may be formed by a sealing material. That is, the water repellent layer WR may be located in the gap CL formed between the inner surface 32A and the fourth end 3414 of the waterproof member 34.

In the foregoing embodiment, the water repellent layer WR is located in the region illustrated in FIG. 15 in the inner surface 32A. However, the invention is not limited thereto. For example, the water repellent layer WR may be formed in the region by coating the entire region of the inner surface 32A facing the waterproof member 34 with the grease. That is, the water repellent layer WR may be located in a range in which a fluid does not infiltrate from the gap CL.

In the foregoing embodiment, the waterproof member 34 covers the circumference of the incidence portion 971 of the light-guiding member 97. However, the invention is not limited thereto. For example, the waterproof member 34 may have a shape that covers a part of the incidence portion 971 of the light-guiding member 97. That is, any one of the first to fourth ends 3411 to 3414 included in the frame body 341 may be included.

The waterproof member 34 is formed in the portion within the predetermined range from the opening end of the opening HPR2. However, the invention is not limited thereto. For example, the entire portion except for the incidence surface 9711 of the incidence portion 971 may be covered. Even in this case, it is possible to obtain the same advantages as those of the foregoing embodiment.

In the foregoing embodiment, the thickness dimension L2 of the second end 3412 of the waterproof member 34 is less than the thickness dimension L1 of the first end 3411. However, the invention is not limited thereto. For example, the thickness dimension L2 of the second end 3412 of the waterproof member 34 may be substantially the same as or greater than the thickness dimension L1 of the first end 3411 or an elastic deformation amount at the time of mounting the upper case 5 may be equal to or less than a predetermined value. Thus, the position of the light-guiding member 97 can be suppressed from being deviated due to elastic deformation of the waterproof member 34.

In the foregoing embodiment, the dimension L3 of the gap formed between the end surface 34161 of the protrusion 3416 and the inner surface 32A of the side surface unit 32R is set to substantially 0.006 mm. However, the invention is not limited thereto. For example, the dimension L3 of the gap may be 0.01 mm or may be 0.001 mm. In this case, a coating amount of the grease may be adjusted so that a fluid such as water does not infiltrate from the gap. That is, the dimension of the gap may be set so that a fluid becoming a droplet due to the water repellent layer does not infiltrate inside. Thus, it is possible to obtain the same advantages as those of the foregoing embodiment.

In the foregoing embodiment, the waterproof member 34 is included. However, the invention is not limited thereto. For example, the waterproof member 34 may not be included.

The water repellent layer WR may be formed directly on the surface of the light-guiding member 97 by coating the circumference of the incidence portion 971 of the light-guiding member 97 with the grease or attaching a waterproof tape instead of the waterproof member 34. Even in this case, since the water repellent layer WR is formed in the gap between the light-guiding member 97 and the inner surface 32A and another gap, the fluid such as water can be suppressed from infiltrating into the accommodation unit HPR.

Further, in a case in which the waterproof member 34 is not installed, the light-guiding member 97 is held by each of the case members 4R and 4L. Therefore, the position of the light-guiding member 97 can be reliably suppressed from being deviated when the waterproof member 34 is pressed by each of the case members 4R and 4L.

In the HMD 1, the case member 4R combined with the frame body 3 to form the accommodation unit HPR includes the substrate holder 6R forming an internal case and the upper case 5R and the lower case 7R forming the external case. However, the invention is not limited thereto and the external case may be integrated. The configuration of each of the members is not limited to the foregoing configuration and can be appropriately modified. The same also applies to the case member 4L.

In the foregoing embodiment, the image projection unit 91 that forms image light according to image information and projects the image light is located inside each of the accommodation units HPR and HPL of the case members 4R and 4L. However, the invention is not limited thereto. For example, image light guided by an optical fiber or the like from the outside of each of the case members 4L and 4R may be projected to the light-guiding member by a projection lens.

In the foregoing embodiment, the light-guiding members 97R and 97L that guide the image light projected from the image projection units 91 accommodated in the accommodation units HPR and HPL serving as a display unit of the HMD 1 to the eyes of the user are adopted. However, the invention is not limited thereto and the display unit may be a display panel such as a liquid crystal panel or an organic EL panel. That is, the invention can also be applied to a closed HMD. Further, any display format of the image may be used as long as the image can be displayed so that a user can view the image. Instead of the light-guiding members 97R and 97L, a reflective member that reflects an image projected by the image projection units 91 to the eyes of the user may be adopted as a display unit.

The members accommodated in each of the accommodation units HPR and HPL may not be the image projection unit 91 and the control unit 96 or may be only one of the image projection unit 91 and the control unit 96. Further, for example, another member such as a control circuit or a power supply necessary for an operation of the display unit may be used.

Further, in the HMD 1, the optical devices 9R and 9L that include the light-guiding members 97R and 97L disposed according to the eyes of a user are configured according to the right and left eyes of the user. However, the invention is not limited thereto and an HMD including only any one of the optical devices 9R and 9L may be configured.

In the HMD 1, one imaging device 8 is installed at the right end unit 31R in the frame body 3. However, the invention is not limited thereto and the position of the imaging device 8 and the number of imaging devices 8 can be appropriately changed. For example, the imaging device 8 may be installed at the left end unit 31L or may be installed in each of the left end 31L and the right end 31R. Further, the imaging device may not be installed in either the right end 31R or the left end 31L. For example, at least one imaging device may be installed in the middle of the frame body 3, the side surface units 32R and 32L, or the case members 4R and 4L.

In the foregoing embodiment, the temples TMR and TML are included. However, the invention is not limited thereto. For example, instead of the temples TMR and TML serving as the mounting member, a band or the like that continues from the holding unit 35R to the holding unit 35L may be installed as a mounting member. A mounting member may be installed which is configured to extend in the extension direction of the side surface unit 32R from the front unit 31 of the frame body 3, include an arm portion which can be suspended on an ear of a user and a band portion which extends downward on the rear surface side from a position near an end of the arm portion, and include a magnet at an end opposite to the end of the band portion on the arm portion side. That is, any configuration of the mounting member can be used.

In the foregoing embodiment, the light-guiding member 97 equivalent to the optical member is held by the case member 4. However, the invention is not limited thereto. For example, a display unit may be configured by the light-guiding member 97 and a member holding the light-guiding member 97 and the display unit may be configured to be held by a frame including the temples TMR and TML. In this case, the member holding the light-guiding member 97 is equivalent to a frame member according to the invention.

In the HMD 1, the control units 96 included in the optical devices 9L and 9R control an operation of the image projection units 91, that is, control formation of images by the image forming devices 92. However, the invention is not limited thereto. For example, as in the control unit 96 included in the optical device 9R, an operation (in addition to lighting of a light-emitting unit) of the imaging device 8 may be controlled, charging of a battery held by the frame 2 may be controlled using power supplied from the outside, and communication with another image display apparatus such as the HMD 1 or an electronic apparatus such as an image supply apparatus may be controlled. That is, a process performed by the control unit 96 accommodated in each of the accommodation units HPR and HPL may be another process. In this case, a control device controlling an operation of the image forming device 92 may be installed in another location.

Further, the control unit 96 is not limited to a printed substrate. The control unit 96 may be a flexible printed substrate or a control unit that includes a circuit element such as an arithmetic processing circuit. That is, any configuration of the control unit according to the invention can be used as long as predetermined control can be performed.

In the foregoing embodiment, the example has been exemplified in which the frame body 3 and the case members 4R and 4L are combined to be configured, and the water repellent layer WR that suppresses a fluid from infiltrating into each of the accommodation units HPR and HPL in which the control unit 96 is accommodated inside is applied to the HMD 1 which is a head mounted image display apparatus. However, the invention is not limited thereto. Even in a configuration in which a hologram element or a semitransflective surface which is a diffraction grating is used or a configuration in which a total reflection mirror such as a pupil division type mirror is used, the water repellent layer WR can be applied as long as the light-guiding member is exposed. Further, the water repellent layer WR may be formed to suppress the fluid from infiltrating into a casing included in the electronic apparatus from the circumference of an optical member (for example, a projection lens) of the electronic apparatus such as a projector. That is, the configuration according to the invention may also be applied to another electronic apparatus that has an optical member. That is, at least a part of the configuration may be applied without being limited to an electronic apparatus mounted on the head of a user to be used according to the invention.

The entire disclosure of Japanese Patent Application No. 2016-139580, filed Jul. 14, 2016 is expressly incorporated by reference herein.

What is claimed is:

1. A display device comprising:
an optical member that guides incident image light;
a frame member that includes an opening in which a part of the optical member is inserted and holds the optical member; and
a water repellent layer that is located between the optical member and an inner surface of the opening, a gap existing between the water repellent layer and the optical member; and
a waterproof member that is installed in at least a part of an incident unit located inside the frame member in the optical member,
wherein the optical member includes an incidence surface of the incident unit on which the image light is incident,
wherein the waterproof member is disposed on an opposite surface side to the incidence surface and in a traveling direction of the image light guided by the optical member so that the gap is formed with the frame member,
wherein the water repellent layer is located in at least one of (i) a portion of the frame member in which the gap is formed or (ii) a portion of the waterproof member.

2. The display device according to claim 1, further comprising:
an image projection unit that projects the image light to the incidence surface of the optical member, and
wherein the incidence surface and the image projection unit are located inside the frame member.

3. The display device according to claim 1,
wherein the waterproof member covers circumference of at least a part of the incident unit, and
wherein in the waterproof member, a part on a side of the incidence surface is thinner than other parts.

4. The display device according to claim 1,
wherein in the waterproof member, a different surface from a surface in which the gap is formed comes into contact with an inner surface of the frame member.

5. The display device according to claim 4,
wherein the water repellent layer is located in a portion of an inner surface of the opening which faces the waterproof member.

6. The display device according to claim 1,
wherein the waterproof member is formed of one of a silicon resin and an elastic material with a water repellent property.

7. The display device according to claim 1,
wherein the water repellent layer is formed in the optical member.

8. The display device according to claim 1,
wherein the water repellent layer is formed of a coating agent with a water repellent property.

9. The display device according to claim 8,
wherein the coating agent contains a fluoropolymer.

10. The display device according to claim 1,
wherein the water repellent layer is formed of a sealing material.

11. A head mounted image display apparatus comprising:
the display device according to claim 1; and
a mounting member that mounts the display device on a head of an observer.

12. A head mounted image display apparatus comprising:
the display device according to claim 2; and
a mounting member that mounts the display device on a head of an observer.

13. A head mounted image display apparatus comprising:
the display device according to claim 3; and
a mounting member that mounts the display device on a head of an observer.

14. A head mounted image display apparatus comprising:
the display device according to claim 4; and
a mounting member that mounts the display device on a head of an observer.

15. A head mounted image display apparatus comprising:
the display device according to claim 5; and
a mounting member that mounts the display device on a head of an observer.

16. A head mounted image display apparatus comprising:
the display device according to claim 6; and
a mounting member that mounts the display device on a head of an observer.

17. A display device comprising:
an optical member that guides incident image light;
a frame member that includes an opening in which a part of the optical member is inserted and holds the optical member;
a water repellent layer that is located between the optical member and an inner surface of the opening;
an image projection unit that projects the image light to the optical member; and
a waterproof member that is installed in at least a part of an incident unit located inside the frame member in the optical member, wherein:
the optical member includes an incidence surface on which the image light projected by the image projection unit is incident,
the incidence surface and the image projection unit are located inside the frame member,
the water repellent layer is located in at least one of the waterproof member and the frame member,
the waterproof member covers a circumference of at least a part of the incident unit, and
in the waterproof member, a part on a side of the incidence surface is thinner than other parts.

\* \* \* \* \*